US007092878B1

(12) United States Patent
Yamada

(10) Patent No.: US 7,092,878 B1
(45) Date of Patent: Aug. 15, 2006

(54) SPEECH SYNTHESIS USING MULTI-MODE CODING WITH A SPEECH SEGMENT DICTIONARY

(75) Inventor: Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/630,356

(22) Filed: Aug. 1, 2000

(30) Foreign Application Priority Data

Aug. 3, 1999 (JP) .......................................... 11-220496
Jul. 21, 2000 (JP) ...................................... 2000-221128

(51) Int. Cl.
*G10L 19/14* (2006.01)
*G06F 17/21* (2006.01)

(52) U.S. Cl. ......................................... 704/230; 704/10

(58) Field of Classification Search ......... 704/200–226, 704/230, 270
See application file for complete search history.

(56) References Cited

U.S. PATENT DOCUMENTS

| | | | | | |
|---|---|---|---|---|---|
| 4,833,718 | A | | 5/1989 | Sprague | |
| 5,073,940 | A | * | 12/1991 | Zinser et al. | 704/226 |
| 5,101,434 | A | * | 3/1992 | King | 704/241 |
| 5,278,943 | A | * | 1/1994 | Gasper et al. | 704/200 |
| 5,671,327 | A | * | 9/1997 | Akamine et al. | 704/219 |
| 5,704,002 | A | * | 12/1997 | Massaloux | 704/220 |
| 5,717,827 | A | | 2/1998 | Narayan | |
| 5,729,694 | A | * | 3/1998 | Holzrichter et al. | 704/270 |
| 5,751,903 | A | * | 5/1998 | Swaminathan et al. | 704/220 |
| 5,774,846 | A | | 6/1998 | Morii | |
| 6,067,518 | A | | 5/2000 | Morii | |
| 6,167,373 | A | | 12/2000 | Morii | |
| 6,173,257 | B1 | * | 1/2001 | Gao | 704/220 |
| 6,182,034 | B1 | * | 1/2001 | Malvar | 704/230 |
| 6,205,421 | B1 | | 3/2001 | Morii | |
| 6,240,384 | B1 | | 5/2001 | Kagoshima et al. | |
| 6,256,608 | B1 | * | 7/2001 | Malvar | 704/230 |
| 6,332,121 | B1 | | 12/2001 | Kagoshima et al. | |
| 6,553,343 | B1 | | 4/2003 | Kagoshima et al. | |

FOREIGN PATENT DOCUMENTS

| | | |
|---|---|---|
| JP | 63-253995 | 10/1988 |
| JP | 05-094199 | 4/1993 |
| JP | 05-134698 | 5/1993 |
| JP | 06-236197 | 8/1994 |
| JP | 06-266399 | 9/1994 |
| JP | 06-291674 | 10/1994 |
| JP | 08-171400 | 7/1996 |
| JP | 09-319391 | 12/1997 |
| JP | 11-085193 | 3/1999 |
| JP | 11-095796 | 4/1999 |
| JP | 11-231890 | 8/1999 |
| JP | 2000-221128 | 8/2000 |

OTHER PUBLICATIONS

Sagisaka ("Speech Synthesis from Text", IEEE Communications Magazine, Jan. 1990).*

(Continued)

*Primary Examiner*—Vijay B. Chawan
(74) *Attorney, Agent, or Firm*—Milbank Tweed Hadley & McCloy LLP

(57) ABSTRACT

Speech segment data are encoded in accordance with their respective optimum encoding schemes. The speech segment data thus encoded are registered in a speech segment dictionary along with information specifying the encoding methods used in the encoding.

10 Claims, 15 Drawing Sheets

OTHER PUBLICATIONS

Olivier van der Vrecken, Nicolas Pierret, Thierry Dutoit, Vincent Pagel, Fabrice Malfrere, Laboratoire de Theorie des Circuilts et de Traitement du Signal (TCTS) Faculte Polytechnique de Mons—Bd Dolez, 31, B–7000 Mons (Belgium); 1997 IEEE International Symposium on Circuits and Systems, Jun. 9–12, 1997 Hong Kong, “New Techniques for the Compression of Synthesizer Databases”.

E. Moulines, F. Emerard, D. Larreur, J.L. Le Sant Milon, L. Le Faucheur, F. Marty, F. Charpentier, C. Sorin, CNET LAA/TSS./RCP 22301 Lannion (France), S6a.4 (Apr. 3–6, 1990, A Real–Time French Text–To–Speech Generating High–Quality Synthetic Speech; Nov. 20, 2003.

L. V. Shenshev, Acoustical Physics, vol. 41. No. 2, 1995, pp. 286–292. Translated from Akussicheskii. Original Russian Text Copyright 1995 by Shenshev., 2379 Acoustical Physics, 41 (1995) Mar./Apr., No. 2, Woodbury, NY, U.S., Compressibility of Flexibly Digitized Speech Sounds (on Naturally Sounding Speech Synthesis).

Office Action Jun. 27, 2005.

* cited by examiner

SPEECH SYNTHESIS USING MULTI-MODE CODING WITH A SPEECH SEGMENT DICTIONARY

FIELD OF THE INVENTION

The present invention relates to a technique for synthesizing speech by using a speech segment dictionary.

BACKGROUND OF THE INVENTION

A speech synthesizing technique for synthesizing speech by using a computer uses a speech segment dictionary. This speech segment dictionary stores speech segments in units (synthetic units) of speech segments, CV/VC, or VCV. To synthesize speech, appropriate speech segments are selected from this speech segment dictionary and modified and connected to generate desired synthetic speech. A flow chart in FIG. 15 explains this process.

In step S131, speech contents expressed by kana-kanji mixed text and the like are input. In step S132, the input speech contents are analyzed to obtain a speech segment symbol string {p0, p1, . . . } and parameters for determining prosody. The flow then advances to step S133 to determine the prosody such as the speech segment time length, fundamental frequency, and power. In speech segment dictionary look-up step S134, speech segments {w0, w1, . . . } appropriate for the speech segment symbol string {p0, p1, . . . } obtained by the input analysis in step S132 and the prosody obtained by the prosody determination in step S133 are retrieved from the speech segment dictionary. The flow advances to step S135, and the speech segments {w0, w1, . . . } obtained by the speech segment dictionary retrieval in step S134 are modified and concatenated to match the prosody determined in step S133. In step S136, the result of the speech segment modification and concatenation in step S135 is output as a synthetic speech.

Waveform editing is one effective method of speech synthesis. This method, e.g., superposes waveforms and changes pitches in synchronism with vocal cord vibrations. The method is advantageous in that synthetic speech close to a natural utterance can be generated with a small amount of arithmetic operations. When a method like this is used, a speech segment dictionary is composed of indexes for retrieval, waveform data (also called speech segment data) corresponding to individual speech segments, and auxiliary information of the data. In this case, all speech segment data registered in the speech segment dictionary are often encoded using the μ-law or ADPCM (Adaptive Differential Pulse Code Modulation).

The above prior art has the following problems.

First, when all speech segment data registered in the speech segment dictionary are encoded by using an encoding scheme such as the μ-law or A-law, no sufficient compression efficiency can be obtained since each speech segment data is nonuniformly quantized using a fixed quantization table. This is so because a quantization table must be so designed that a minimum quality can be maintained for all types of speech segments.

Second, when all speech segment data registered in the speech segment dictionary are encoded using an encoding scheme such as ADPCM, the operation amount in decoding increases by the operation amount of an adaptive algorithm. This is so because the advantage (small processing amount) of the waveform editing method is impaired if a large operation amount is required for decoding.

SUMMARY OF THE INVENTION

The present invention has been made in consideration of the above prior art, and has as its object to provide a technique which very efficiently reduces a storage capacity necessary for a speech segment dictionary without degrading the quality of speech segments registered in the speech segment dictionary.

Also, the present invention has been made in consideration of the above prior art, and has as its another object to provide a technique which generates natural, high-quality synthetic speech.

To achieve the above objects, a speech information processing method of the present invention is a speech information processing method of generating a speech segment dictionary for holding a plurality of speech segments, characterized by comprising the selection step of selecting an encoding method of encoding a speech segment from a plurality of encoding methods, the encoding step of encoding the speech segment by using the selected encoding method, and the storage step of storing the encoded speech segment in a speech segment dictionary.

A storage medium of the present invention is characterized by storing a control program for allowing a computer to realize the above speech information processing method.

A speech information processing apparatus of the present invention is a speech information processing apparatus for generating a speech segment dictionary for holding a plurality of speech segments, characterized by comprising selecting means for selecting an encoding method of encoding a speech segment from a plurality of encoding methods, encoding means for encoding the speech segment by using the selected encoding method, and storage means for storing the encoded speech segment in a speech segment dictionary.

A speech information processing method of the present invention is a speech information processing method of synthesizing speech by using a speech segment dictionary for holding a plurality of speech segments, characterized by comprising the selection step of selecting, from a plurality of decoding methods, a decoding method of decoding a speech segment read out from the speech segment dictionary, the decoding step of decoding the speech segment by using the selected decoding method, and the speech synthesizing step of synthesizing speech on the basis of the decoded speech segment.

A storage medium of the present invention is characterized by storing a control program for allowing a computer to realize the above speech information processing method.

A speech information processing apparatus of the present invention is a speech information processing apparatus for synthesizing speech by using a speech segment dictionary for holding a plurality of speech segments, characterized by comprising selecting means for selecting, from a plurality of decoding methods, a decoding method of decoding a speech segment read out from the speech segment dictionary, decoding means for decoding the speech segment by using the selected decoding method, and speech synthesizing means for synthesizing speech on the basis of the decoded speech segment.

A speech information processing method of the present invention is a speech information processing method of generating a speech segment dictionary for holding a plurality of speech segments, characterized by comprising the setting step of setting an encoding method of encoding a speech segment in accordance with the type of the speech segment, the encoding step of encoding the speech segment by using the set encoding method, and the storage step of storing the encoded speech segment in a speech segment dictionary.

A storage medium of the present invention is characterized by comprising a control program for allowing a computer to realize the above speech information processing method.

A speech information processing apparatus of the present-invention is a speech information processing apparatus for generating a speech segment dictionary for holding a plurality of speech segments, characterized by comprising setting means for setting an encoding method of encoding a speech segment in accordance with the type of the speech segment, encoding means for encoding the speech segment by using the set encoding method, and storage means for storing the encoded speech segment in a speech segment dictionary.

A speech information processing method of the present invention is a speech information processing method of synthesizing speech by using a speech segment dictionary for holding a plurality of speech segments, characterized by comprising the setting step of setting a decoding method of decoding a speech segment read out from the speech segment dictionary in accordance with the type of the speech segment, the decoding step of decoding the speech segment by using the set decoding method, and the speech synthesizing step of synthesizing speech on the basis of the decoded speech segment.

A storage medium of the present invention is characterized by comprising a control program for allowing a computer to realize the above speech information processing method.

A speech information processing apparatus of the present invention is a speech information processing apparatus for synthesizing speech by using a speech segment dictionary for holding a plurality of speech segments, characterized by comprising setting means for setting a decoding method of decoding a speech segment read out from the speech segment dictionary in accordance with the type of the speech segment, decoding means for decoding the speech segment by using the set decoding method, and speech synthesizing means for synthesizing speech on the basis of the decoded speech segment.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings. In these embodiments, (1) a method of forming a speech segment dictionary (a speech segment dictionary formation algorithm) and (2) a method of synthesizing speech by using this speech segment dictionary (a speech synthesis algorithm) will be described in detail.

Figure 1:
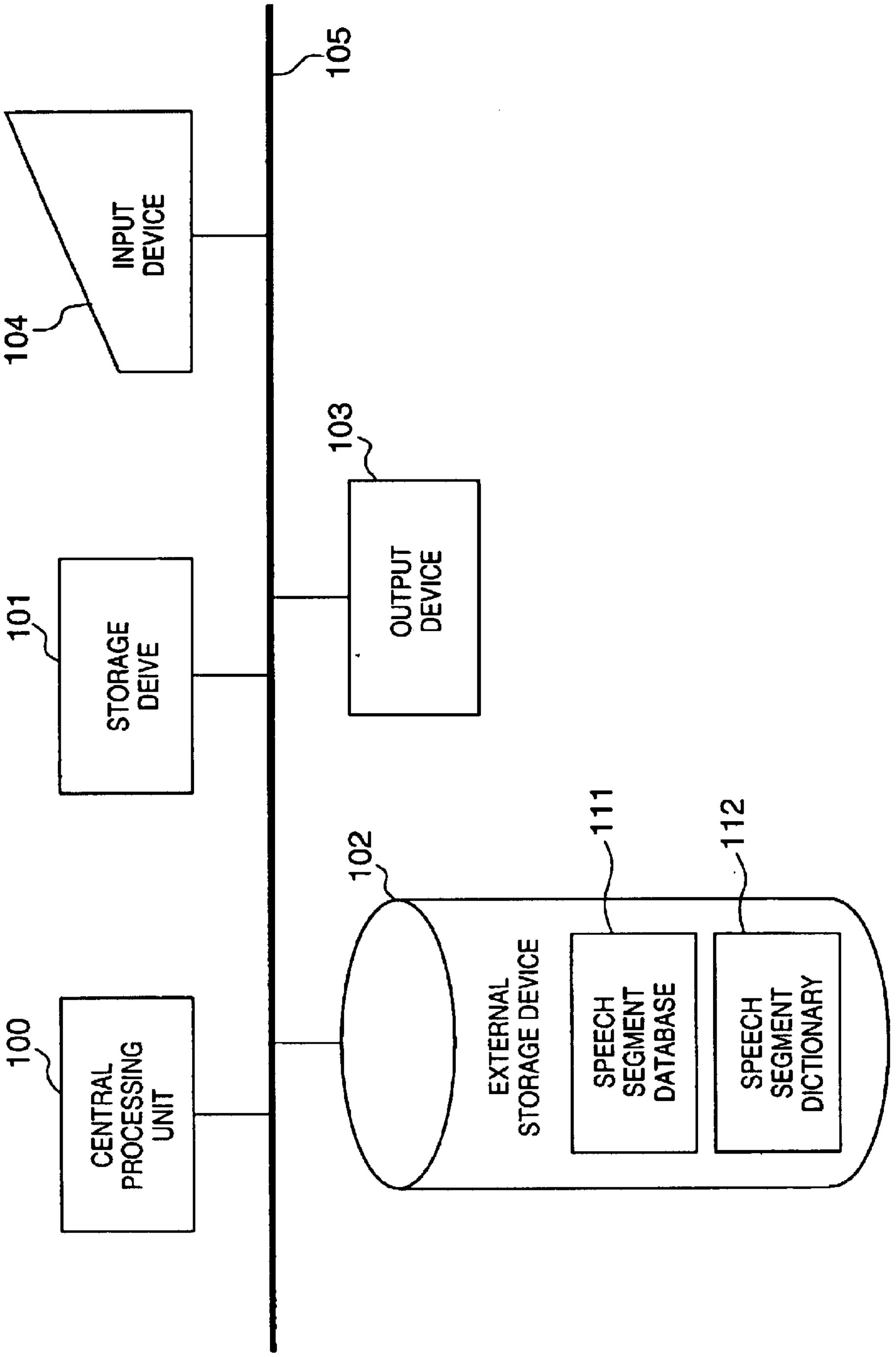
FIG. 1 is block diagram showing the hardware configuration of a speech synthesizing apparatus according to each embodiment of the present invention.

FIG. 1 is a block diagram showing an outline of the functional configuration of a speech information processing apparatus according to the embodiments of the present invention. A speech segment dictionary formation algorithm and a speech synthesis algorithm in each embodiment are realized by using this speech information processing apparatus.

Referring to FIG. 1, a central processing unit (CPU) 100 executes numerical operations and various control processes and controls operations of individual units (to be described later) connected via a bus 105. A storage device 101 includes, e.g., a RAM and ROM and stores various control programs executed by the CPU 100, data, and the like. The storage device 101 also temporarily stores various data necessary for the control by the CPU 100. An external storage device 102 is a hard disk device or the like and includes speech segment database 111 and a speech segment dictionary 112. This speech segment database 111 holds speech segments before registration in the speech segment dictionary 112 (i.e., non-compressed speech segments). An output device 103 includes a monitor for displaying the operation statuses of diverse programs, a loudspeaker for outputting synthesized speech, and the like. An input device 104 includes, e.g., a keyboard and a mouse. By using this input device 104, a user can control a program for forming the speech segment dictionary 112, control a program for synthesizing speech by using the speech segment dictionary 112, and input text (containing a plurality of character strings) as an object of speech synthesis.

On the basis of the above configuration, a speech segment dictionary formation algorithm and a speech synthesis algorithm in each embodiment will be described below.

First Embodiment

A speech segment dictionary formation algorithm and a speech synthesis algorithm according to the first embodiment of the present invention will be described below by using the speech processing apparatus shown in FIG. 1.

In the first embodiment, one of a plurality of encoding methods (more specifically, a 7-bit μ-law scheme and an 8-bit μ-law scheme) different in the number of quantization steps is selected for each speech segment to be registered in a speech segment dictionary 112. Note that a speech segment to be registered in the speech segment dictionary 112 is composed of a phoneme, semi-phoneme, diphone (e.g., CV or VC), VCV (or CVC), or combinations thereof.

(Formation of speech segment dictionary)

Figure 2:
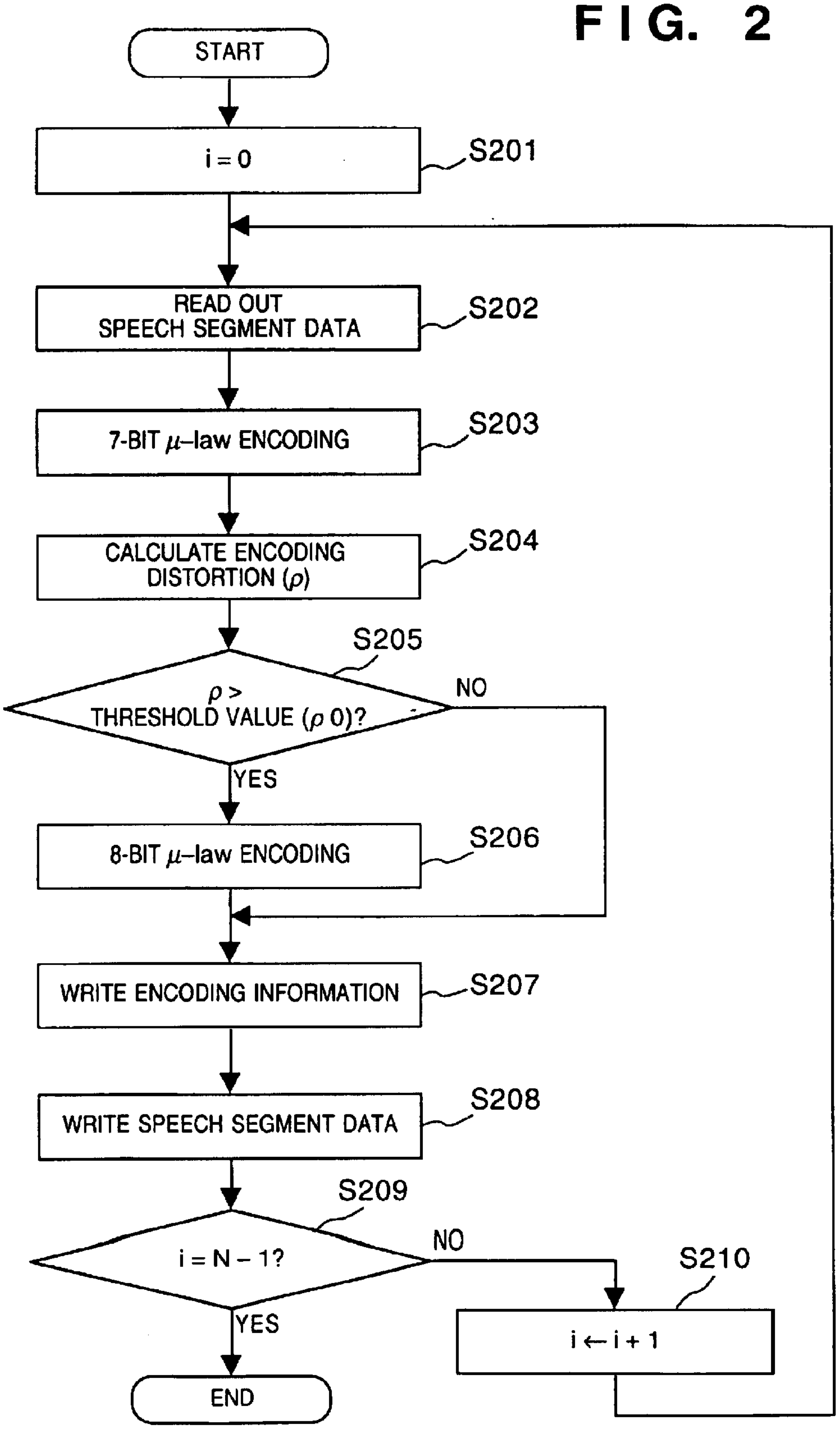
FIG. 2 is a flow chart for explaining a speech segment dictionary formation algorithm in the first embodiment of the present invention.

FIG. 2 is a flow chart for explaining the speech segment dictionary formation algorithm in the first embodiment of the present invention. A program for achieving this algorithm is stored in a storage device 101. A CPU 100 reads out this program from the storage device 101 on the basis of an instruction from a user and executes the following procedure.

In step S201, the CPU 100 initializes an index i, which indicates each of N speech segment data (each speech segment data is non-compressed) stored in speech segment database 111 of an external storage device 102, to "0". Note that this index i is stored in the storage device 101.

In step S202, the CPU 100 reads out ith speech segment data Wi indicated by this index i. Assume that the readout data Wi is $$Wi=\{x0, x1, \ldots, xT-1\}$$

where T is the time length (in units of samples) of Wi.

In step S203, the CPU 100 encodes the speech segment data Wi read out in step S202 by using the 7-bit μ-law scheme. Assume that the result of the encoding is $$Ci=\{c0, c1, \ldots, cT-1\}$$

In step S204, the CPU 100 calculates encoding distortion ρ produced by the 7-bit μ-law encoding in step S203. In this embodiment, a mean square error ρ is used as a measure of this encoding distortion. This mean square error ρ can be represented by $$\rho=(1/T)\cdot\Sigma(xt-\mu(7)^{-1}(ct))^2 \quad (1)$$

where $\mu(7)^{-1}(\ )$ is a 7-bit μ-law decoding function. In this equation, "Σ" is the summation from t=0 to t=T−1.

In step S205, the CPU 100 checks whether the encoding distortion ρ calculated in step S204 is larger than a predetermined threshold value ρ0. If ρ>ρ0, the CPU 100 determines that the waveform of the speech segment data Wi is distorted by encoding using the 7-bit μ-law scheme. Therefore, in step S206 the CPU 100 switches the encoding method to the 8-bit μ-law scheme having a different number of quantization bits. In other cases, the flow advances to step S207. In step S206, the CPU 100 encodes the speech segment data Wi read out in step S202 by using the 8-bit μ-law scheme. Assume that the result of the encoding is $$Ci=\{c0, c1, \ldots, cT-1\}$$

In step S207, the CPU 100 writes encoding information of the phoneme data Wi and the like in the phoneme dictionary 112. In addition to the encoding information, the CPU 100 writes information necessary to decode the phoneme data Wi. This encoding information specifies the encoding method by which the speech segment data Wi is encoded:

The encoding information is "0" if the encoding method is the 7-bit μ-law scheme The encoding information is "1" if the encoding method is the 8-bit μ-low scheme.

In step S208, the CPU 100 writes the speech segment data Wi encoded by one encoding scheme in the speech segment dictionary 112. In step S209, the CPU 100 checks whether the above processing is performed for all of the N speech segment data. If i=N−1, the CPU 100 completes this algorithm. If not, in step S210 the CPU 100 adds 1 to the index i, the flow returns to step S202, and the CPU 100 reads out speech segment data designated by the updated index i. The CPU 100 repeatedly executes this processing for all of the N speech segment data.

In the speech segment dictionary formation algorithm of the first embodiment as described above, an encoding scheme can be selected from the 7-bit μ-law scheme and the 8-bit μ-law scheme for each speech segment to be registered in the speech segment dictionary 112. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the first embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 3:
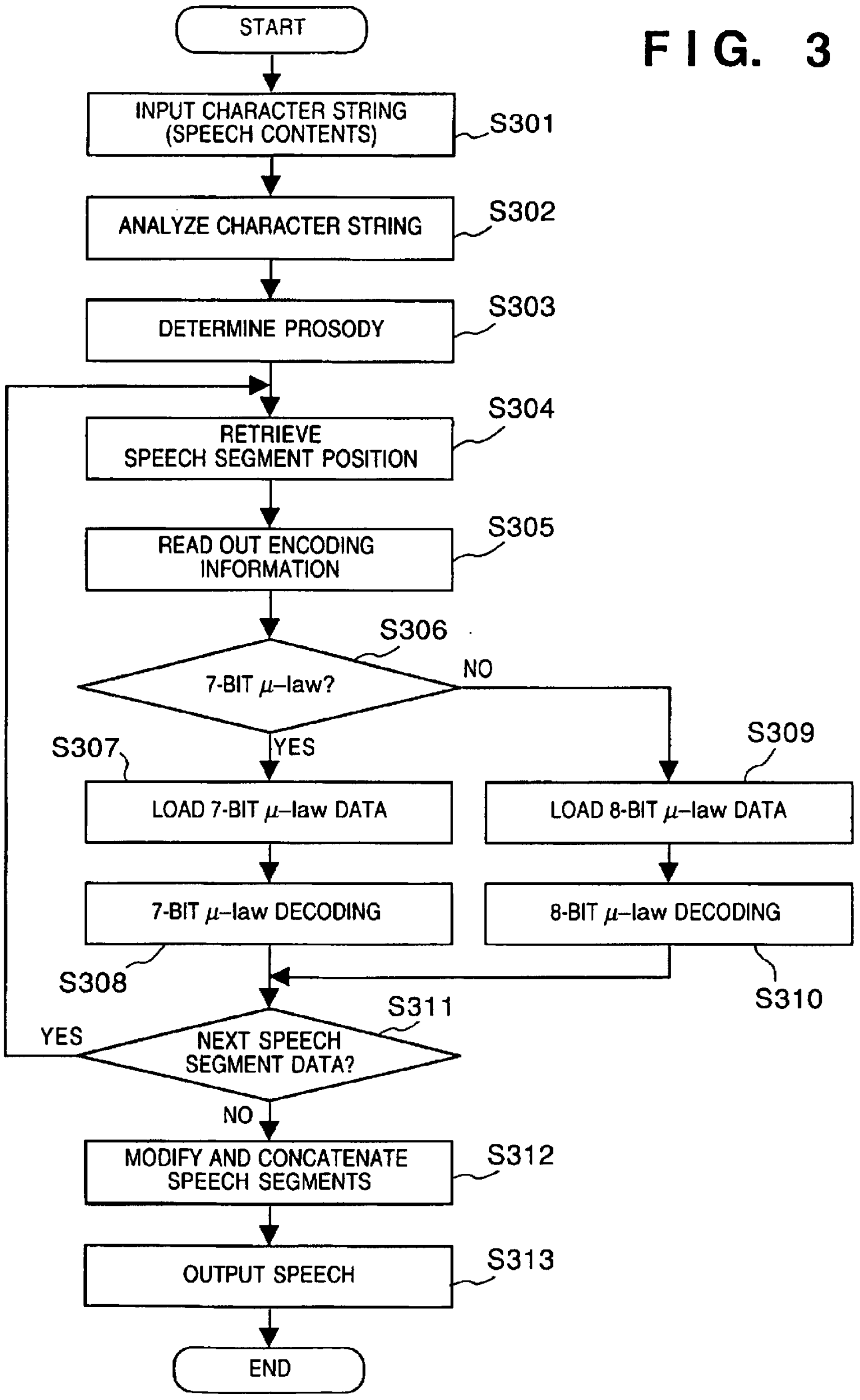
FIG. 3 is a flow chart for explaining a speech synthesis algorithm in the first embodiment of the present invention.

FIG. 3 is a flow chart for explaining the speech synthesis algorithm in the first embodiment of the present invention. A program for achieving this algorithm is stored in the storage device 101. The CPU 100 reads out this program on the basis of an instruction from a user and executes the following procedure.

In step S301, the user inputs a character string in Japanese, English, or some other language by using the keyboard and the mouse of an input device 104. In the case of Japanese, the user inputs a character string expressed by kana-kanji mixed text. In step S302, the CPU 100 analyzes the input character string and obtains the speech segment sequence of this character string and parameters for determining the prosody of this character string. In step S303, on the basis of the prosodic parameters obtained in step S302, the CPU 100 determines prosody such as a duration length (the prosody for controlling the length of a voice), fundamental frequency (the prosody for controlling the pitch of a voice), and power (the prosody for controlling the strength of a voice).

In step S304, the CPU 100 obtains an optimum speech segment sequence on the basis of the speech segment sequence obtained in step S302 and the prosody determined in step S303. The CPU 100 selects one speech segment contained in this speech segment sequence and retrieves speech segment data corresponding to the selected speech segment and encoding information corresponding to this speech segment data. If the speech segment dictionary 112 is stored in a storage medium such as a hard disk, the CPU 100 sequentially seeks to storage areas of encoding information and speech segment data. If the speech segment dictionary 112 is stored in a storage medium such as a RAM, the CPU 100 sequentially moves a pointer (address register) to storage areas of encoding information and speech segment data.

In step S305, the CPU 100 reads out the encoding information retrieved in step S304 from the speech segment dictionary 112. This encoding information indicates the encoding method of the speech segment data retrieved in step S304:

If the encoding information is "0", the encoding method is the 7-bit μ-law scheme If the encoding information is "1", the encoding method is the 8-bit μ-law scheme In step S306, the CPU 100 examines the encoding information read out in step S305. If the encoding information is "0", the CPU 100 selects a decoding method corresponding to the 7-bit μ-law scheme, and the flow advances to step S307. If the encoding information is "1", the CPU 100 selects a decoding method corresponding to the 8-bit μ-law scheme, and the flow advances to step S309.

In step S307, the CPU 100 reads out the speech segment data (encoded by the 7-bit μ-law scheme) retrieved in step S304 from the speech segment dictionary 112. In step S308, the CPU 100 decodes the speech segment data encoded by the 7-bit μ-law scheme.

On the other hand, in step S309 the CPU 100 reads out the speech segment data (encoded by the 8-bit μ-law scheme) retrieved in step S304 from the speech segment dictionary 112. In step S310, the CPU 100 decodes the speech segment data encoded by the 8-bit μ-law scheme.

In step S311, the CPU 100 checks whether speech segment data corresponding to all speech segments contained in the speech segment sequence obtained in step S304 are decoded. If all speech segment data are decoded, the flow advances to step S312. If speech segment data not decoded yet is present, the flow returns to step S304 to decode the next speech segment data.

In step S312, on the basis of the prosody determined in step S303, the CPU 100 modifies and concatenates the decoded speech segments (i.e., edits the waveform). In step S313, the CPU 100 outputs the synthetic speech obtained in step S312 from the loudspeaker of an output device 103.

In the speech synthesis algorithm of the first embodiment as described above, a desired speech segment can be decoded by a decoding method corresponding to the 7-bit μ-law scheme or the 8-bit μ-law scheme. With this arrangement, natural, high-quality synthetic speech can be generated.

In the first embodiment, the aforementioned speech synthesis algorithm is realized on the basis of the program stored in the storage device 101. However, a part or the whole of this speech synthesis algorithm can also be constituted by hardware.

First Modification of the First Embodiment

In the first embodiment, speech segment data whose encoding distortion is larger than a predetermined threshold value is encoded by the 8-bit μ-law scheme. However, it is also possible to obtain the encoding distortion after encoding is performed by the 8-bit μ-law scheme, and register speech segment data whose encoding distortion is larger than a predetermined threshold value in a speech segment dictionary without encoding the data. With this arrangement, degradation of the quality of an unstable speech segment (e.g., a speech segment classified into a voiced fricative sound or a plosive) can be prevented. Also, natural, high-quality synthetic speech can be generated by using a speech segment dictionary thus formed.

Second Modification of the First Embodiment

In the first embodiment, an encoding method is selected from the 7-bit μ-law scheme and the 8-bit μ-law scheme in accordance with the encoding distortion. However, it is also possible, in accordance with the type (e.g., a voiced fricative sound, plosive, nasal sound, some other voiced sound, or unvoiced sound) of speech segment, to choose to encode the speech segment by the 7-bit μ-law scheme or the 8-bit μ-law scheme or to register the speech segment in the speech segment dictionary 112 without encoding it. For example, a speech segment of the type of a voiced fricative sound and plosive may be registered in the speech segment dictionary 112 without encoding it, and a speech segment of the type of nasal sound and unvoiced sound may be registered in the speech segment dictionary 112 by encoding with the 7-bit μ-law scheme, and a speech segment of the type of other voiced sound may be registered in the speech segment dictionary 112 by encoding with the 8-bit μ-law scheme.

Second Embodiment

A speech segment dictionary formation algorithm and a speech synthesis algorithm according to the second embodiment of the present invention will be described below by using the speech processing apparatus shown in FIG. 1.

In the second embodiment, one of a plurality of encoding methods using different quantization code books is selected for each speech segment to be registered in a speech segment dictionary 112. Note that a speech segment to be registered in the speech segment dictionary 112 is composed of a phoneme, semi-phoneme, diphone (e.g., CV or VC), VCV (or CVC), or combinations thereof.

(Formation of Speech Segment Dictionary)

Figure 4:
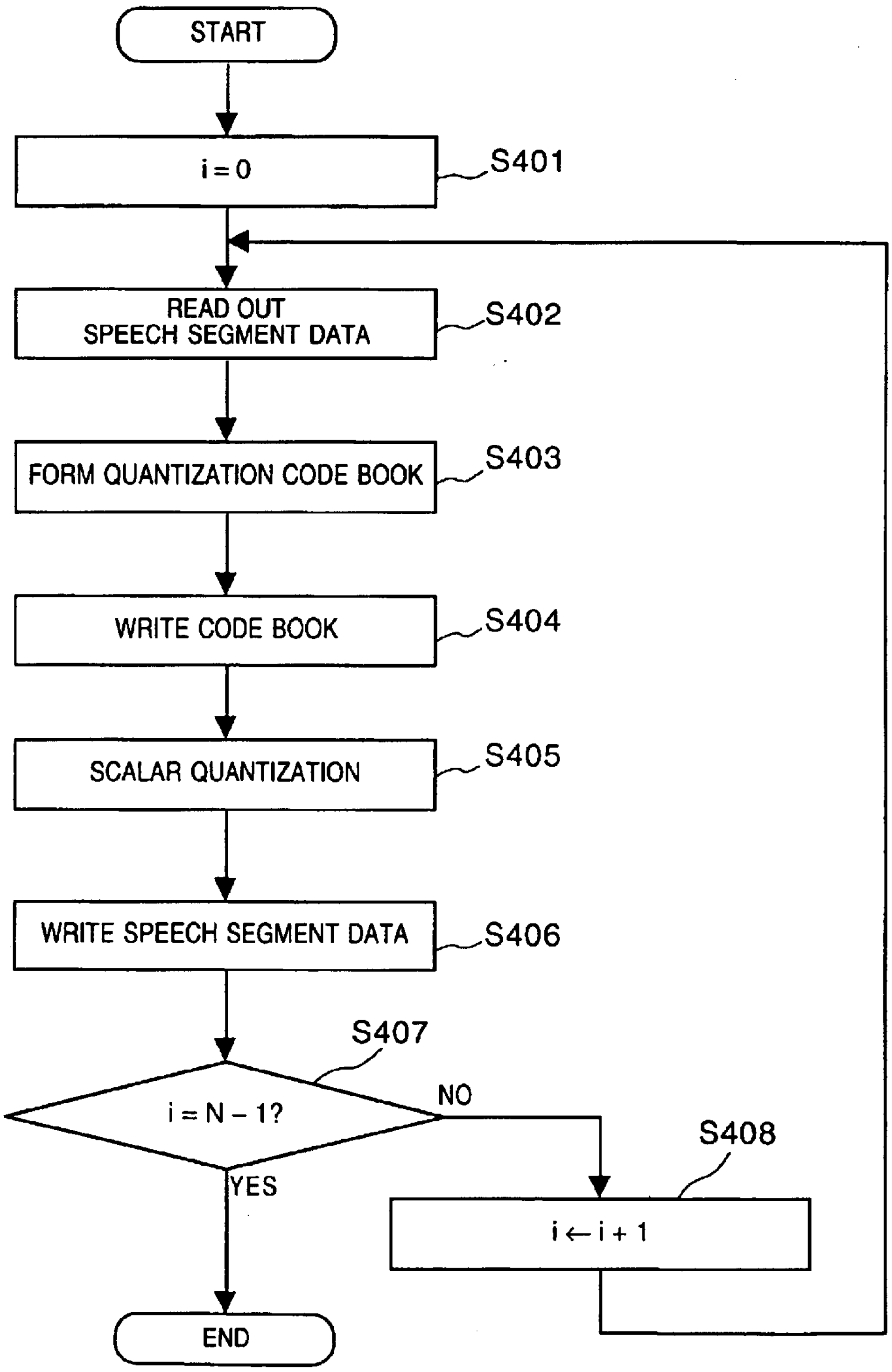
FIG. 4 is a flow chart for explaining a speech segment dictionary formation algorithm in the second embodiment of the present invention.

FIG. 4 is a flow chart for explaining the speech segment dictionary formation algorithm in the second embodiment of the present invention. A program for achieving this algorithm is stored in a storage device 101. A CPU 100 reads out this program from the storage device 101 on the basis of an instruction from a user and executes the following procedure.

In step S401, the CPU 100 initializes an index i, which indicates each of N speech segment data (each speech segment data is non-compressed) stored in speech segment database 111 of an external storage device 102, to "0". Note that this index i is stored in the storage device 101.

In step S402, the CPU 100 reads out ith speech segment data Wi indicated by this index i. Assume that the readout data Wi is $$Wi=\{x0, x1, \ldots, xT-1\}$$

where T is the time length (in units of samples) of Wi.

In step S403, the CPU 100 forms a scalar quantization code book Qi of the speech segment data Wi read out in step S402. More specifically, the CPU 100 decodes the encoded speech segment data Wi by using the scalar quantization code book Qi and so designs that a mean square error ρ of decoded data sequence Yi={y0, y1, . . . , yT−1} is a minimum (i.e., the encoding distortion is a minimum). In this case, an algorithm such as an LBG method is usable. With this arrangement, the distortion of the waveform of a speech segment produced by encoding can be minimized. Note that the mean square error ρ can be represented by $$\rho=(1/T)\cdot\Sigma(xt-yt)^2 \quad (2)$$

where "Σ" is the summation from t=0 to t=T−1.

In step S404, the CPU 100 writes the scalar quantization code book Qi formed in step S403 and the like in the speech segment dictionary 112. In addition to the quantization code book Qi, the CPU 100 writes information necessary to decode the speech segment data Wi. In step S405, the CPU 100 encodes (scalar-quantizes) the speech segment data Wi by using the quantization code book Qi formed in step S403.

Assuming the code book Qi is

Qi={q0, q1, . . . , qN−1} (N is the quantization step), a code ct corresponding to xt (∈Wi) can be represented by $$ct=\text{argn min } (xt-qn)^2 (0\leq n<N) \quad (3)$$

In step S406, the CPU 100 writes speech segment data Ci (={c0, c1, . . . , cT−1} encoded in step S405 into the speech segment dictionary 112. In step S407, the CPU 100 checks whether the above processing is performed for all of the N speech segment data. If i=N−1, the CPU 100 completes this algorithm. If not, in step S408 the CPU 100 adds 1 to the index i, the flow returns to step S402, and the CPU 100 reads out speech segment data designated by the updated index i. The CPU 100 repeatedly executes this processing for all of the N speech segment data.

In the speech segment dictionary formation algorithm of the second embodiment as described above, it is possible to form a quantization code book for each speech segment to be registered in the speech segment dictionary 112 and scalar-quantize the speech segment by using the formed quantization code book. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the second embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 5:
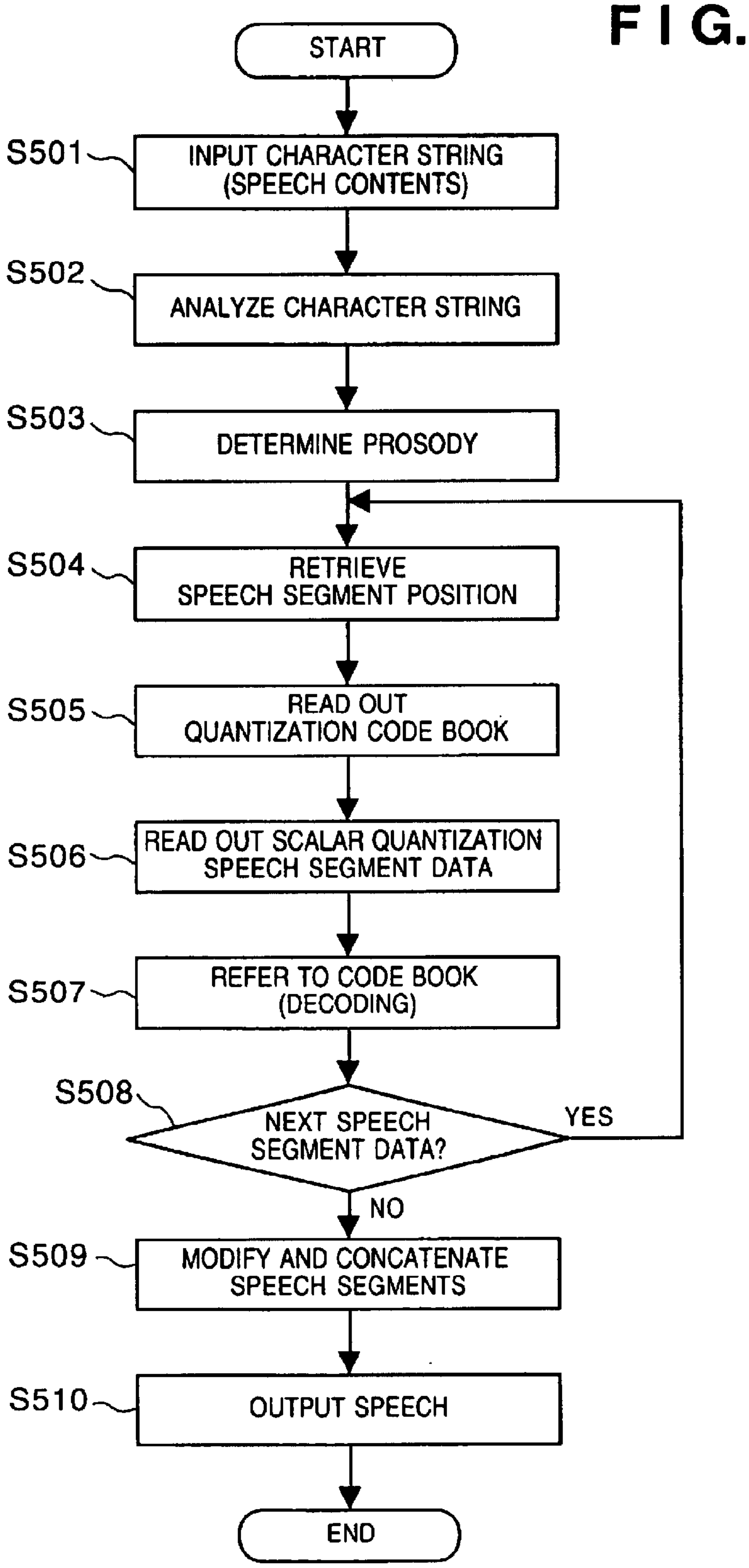
FIG. 5 is a flow chart for explaining a speech synthesis algorithm in the second embodiment of the present invention.

FIG. 5 is a flow chart for explaining the speech synthesis algorithm in the second embodiment of the present invention. A program for achieving this algorithm is stored in the storage device 101. The CPU 100 reads out this program on the basis of an instruction from a user and executes the following procedure.

In step S501, the user inputs a character string in Japanese, English, or some other language by using the keyboard and the mouse of an input device 104. In the case of Japanese, the user inputs a character string expressed by kana-kanji mixed text. In step S502, the CPU 100 analyzes the input character string and obtains the speech segment sequence of this character string and parameters for determining the prosody of this character string. In step S503, on the basis of the prosodic parameters obtained in step S502, the CPU 100 determines prosody such as a duration length (the prosody for controlling the length of a voice), fundamental frequency (the prosody for controlling the pitch of a voice), and power (the prosody for controlling the strength of a voice).

In step S504, the CPU 100 obtains an optimum speech segment sequence on the basis of the speech segment sequence obtained in step S502 and the prosody determined in step S503. The CPU 100 selects one speech segment contained in this speech segment sequence and retrieves a scalar quantization code book and speech segment data corresponding to the selected speech segment. If the speech segment dictionary 112 is stored in a storage medium such as a hard disk, the CPU 100 sequentially seeks to storage areas of scalar quantization code books and speech segment data. If the speech segment dictionary 112 is stored in a storage medium such as a RAM, the CPU 100 sequentially moves a pointer (address register) to storage areas of scalar quantization code books and speech segment data.

In step S505, the CPU 100 reads out the scalar quantization code book retrieved in step S504 from the speech segment dictionary 112. In step S506, the CPU 100 reads out the speech segment data retrieved in step S504 from the speech segment dictionary 112. In step S507, the CPU 100 decodes the speech segment data read out in step S506 by using the scalar quantization code book read out in step S505.

In step S508, the CPU 100 checks whether speech segment data corresponding to all speech segments contained in the speech segment sequence obtained in step S504 are decoded. If all speech segment data are decoded, the flow advances to step S509. If speech segment data not decoded yet is present, the flow returns to step S504 to decode the next speech segment data.

In step S509, on the basis of the prosody determined in step S503, the CPU 100 modifies and connects the decoded speech segments (i.e., edits the waveform). In step S510, the CPU 100 outputs the synthetic speech obtained in step S509 from the loudspeaker of an output device 103.

In the speech synthesis algorithm of the second embodiment as described above, a desired speech segment can be decoded using an optimum quantization code book for the speech segment. Accordingly, natural, high-quality synthetic speech can be generated.

In the second embodiment, the aforementioned speech synthesis algorithm is realized on the basis of the program stored in the storage device 101. However, a part or the whole of this speech synthesis algorithm can also be constituted by hardware.

First Modification of the Second Embodiment

In the second embodiment, as in the first embodiment described previously, the number of bits (i.e., the number of quantization steps of scalar quantization) per sample can be changed for each speech segment data. This can be accomplished by changing the procedures of the second embodiment as follows. That is, in the speech segment dictionary formation algorithm, the number of quantization steps is determined prior to the process (the write of the scalar quantization code book) in step S404 of FIG. 4. The determined number of quantization steps and the code book are recorded in the speech segment dictionary 112. In the speech synthesis algorithm, the number of quantization steps is read out from the speech segment dictionary 112 before the process (the read-out of the scalar quantization code book) in step S505. As in the first embodiment, the number of quantization steps can be determined on the basis of the encoding distortion.

Second Modification of the Second Embodiment

In the speech synthesis algorithm of the second embodiment, in step S505 a scalar quantization code book formed for each speech segment data is selected. However, the present invention is not limited to this embodiment. For example, from a plurality of types of scalar quantization code books previously held by the speech segment dictionary 112, a code book having the highest performance (i.e., by which the quantization distortion is a minimum) can also be chosen.

Third Modification of the Second Embodiment

In the second embodiment, a quantization code book is so designed that the encoding distortion is a minimum, and speech segment data is scalar-quantized by using the designed quantization code book. However, speech segment data whose encoding distortion is larger than a predetermined threshold value can also be registered in a speech segment dictionary without being encoded. With this arrangement, degradation of the quality of an unstable speech segment (e.g., a speech segment classified into a voiced fricative sound or a plosive) can be prevented. Also, natural, high-quality synthetic speech can be generated by using a speech segment dictionary thus formed.

Third Embodiment

A speech segment dictionary formation algorithm and a speech synthesis algorithm according to the second embodiment of the present invention will be described below by using the speech processing apparatus shown in FIG. 1.

In the above second embodiment, one of a plurality of encoding methods using different quantization code books is selected for each speech segment to be registered in a speech segment dictionary 112. In this third embodiment, however, one of a plurality of encoding methods using different quantization code books is selected for each of a plurality of speech segment clusters. Note that a speech segment to be registered in the speech segment dictionary 112 is composed of a phoneme, semi-phoneme, diphone (e.g., CV or VC), VCV (or CVC), or combinations thereof.

(Formation of Speech Segment Dictionary)

Figure 6:
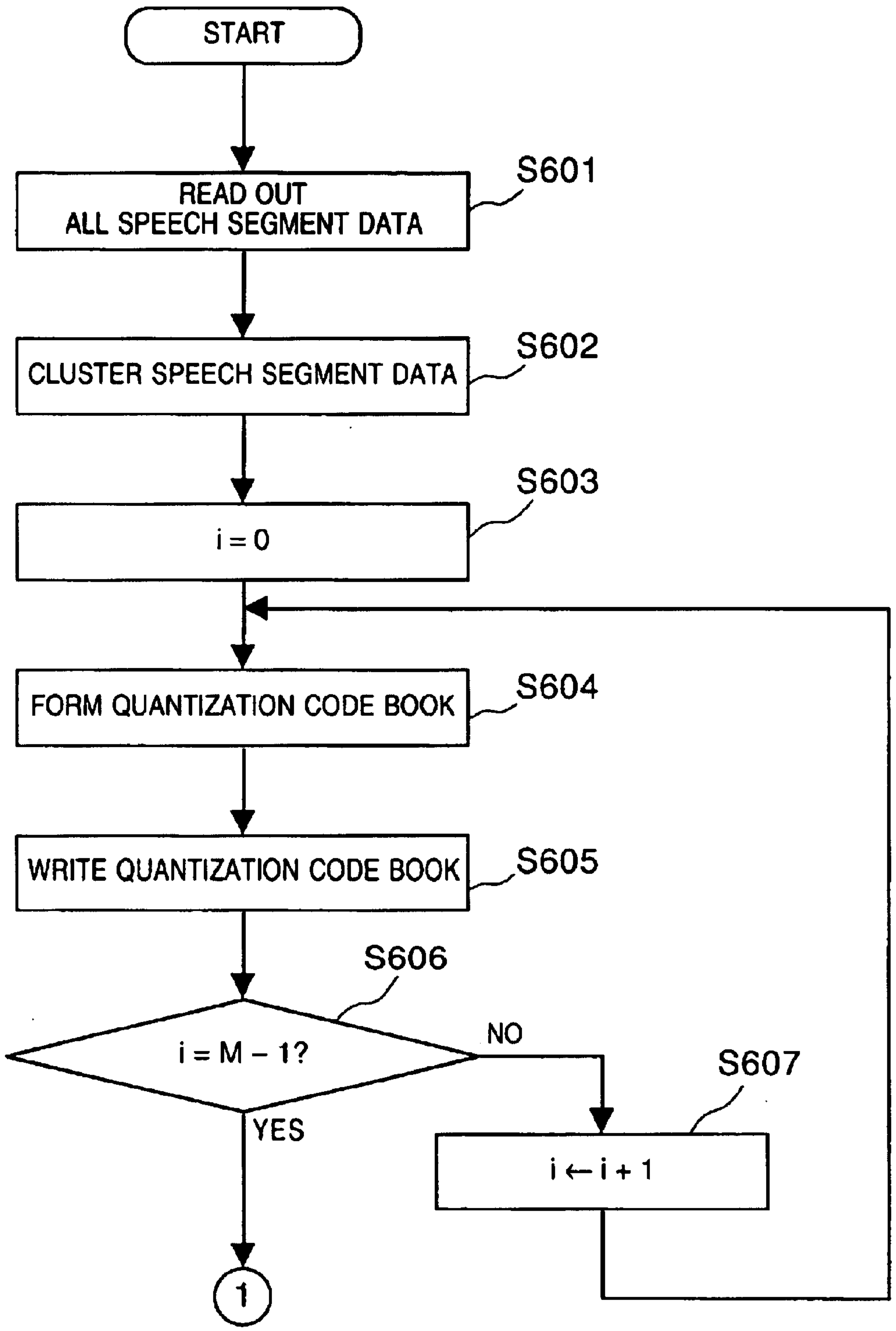
FIG. 6 is a flow chart for explaining a speech segment dictionary formation algorithm in the third embodiment of the present invention.
Figure 7:
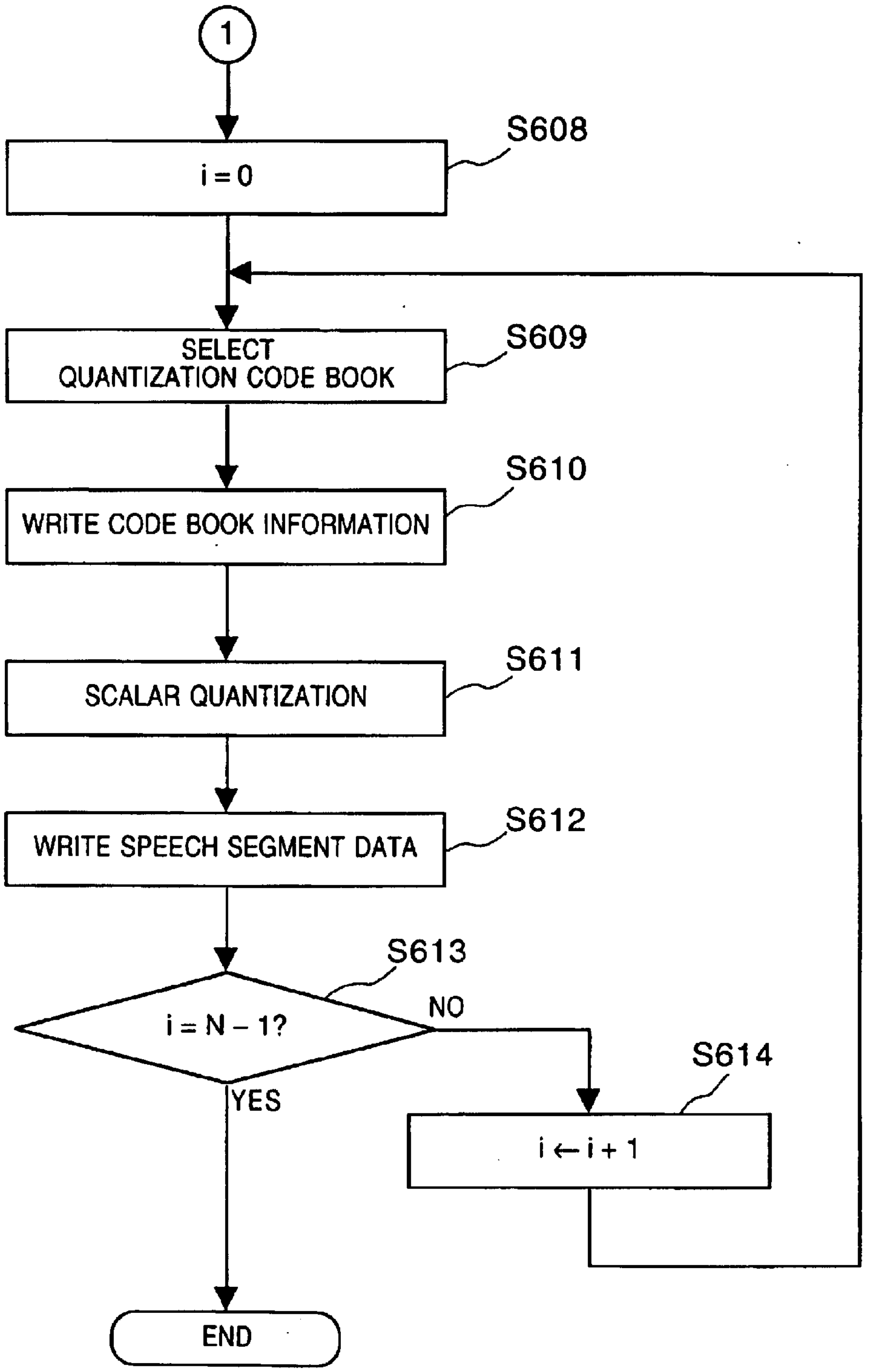
FIG. 7 is a flow chart for explaining the speech segment dictionary formation algorithm in the third embodiment of the present invention.

FIG. 6 is a flow chart for explaining the speech segment dictionary formation algorithm in the third embodiment of the present invention. A program for achieving this algorithm is stored in a storage device 101. A CPU 100 reads out this program from the storage device 101 on the basis of an instruction from a user and executes the following procedure.

In step S601, the CPU 100 reads out all of N speech segment data (each speech segment data is non-compressed) stored in speech segment database 111 of an external storage device 102. In step S602, the CPU 100 clusters all these speech segments into a plurality of (M) speech segment clusters. More specifically, the CPU 100 forms M speech segment clusters in accordance with the similarity of the waveform of each speech segment.

In step S603, the CPU 100 initializes index i which indicates each of the M speech segment clusters to "0". In step S604, the CPU 100 forms a scalar quantization code book Qi for ith speech segment cluster Li. In step S605, the CPU 100 writes the code book Qi formed in step S604 into the speech segment dictionary 112.

In step S606, the CPU 100 checks whether the above processing is performed for all of the M speech segment clusters. If i=M−1 (the processing is completely performed for all of the M speech segment clusters), the flow advances to step S608. If not, in step S607 the CPU 100 adds 1 to the index i, the flow returns to step S604, and the CPU 100 forms a scalar quantization code book for the next speech segment cluster.

After scalar quantization code books are formed for all of the M speech segment clusters, this algorithm advances to step S608. In step S608, the CPU 100 initializes index i, which indicates each of the N speech segments stored in the speech segment database 111 of the external storage device 102, to "0". Instep S609, the CPU 100 selects a scalar quantization code book Qi for ith speech segment data Wi. This scalar quantization code book Qi selected is a quantization code book corresponding to a speech segment cluster to which the speech segment data Wi belongs.

In step S610, the CPU 100 writes information (code book information) designating the scalar quantization code book selected in step S609 and the like into the speech segment dictionary 112. In addition to the code book information, the CPU 100 writes information necessary to decode the speech segment data Wi. In step S611, the CPU 100 encodes the speech segment data Wi by using the code book Qi formed in step S604. In step S612, the CPU 100 writes speech segment data Ci(={c0, c1, . . . , cT−1} encoded in step S611 into the speech segment dictionary 112.

In step S613, the CPU 100 checks whether the above processing is performed for all of the N speech segment data. If i=N−1, the CPU 100 completes this algorithm. If not, in step S614 the CPU 100 adds 1 to the index i, the flow returns to step S609, and the CPU 100 forms a scalar quantization code book for the next speech segment data.

In the speech segment dictionary formation algorithm of the third embodiment as described above, one of a plurality of encoding methods using different quantization code books can be selected for each of a plurality of speech segment clusters. This can reduce the number of quantization code books to be registered in the speech segment dictionary 112. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the third embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 8:
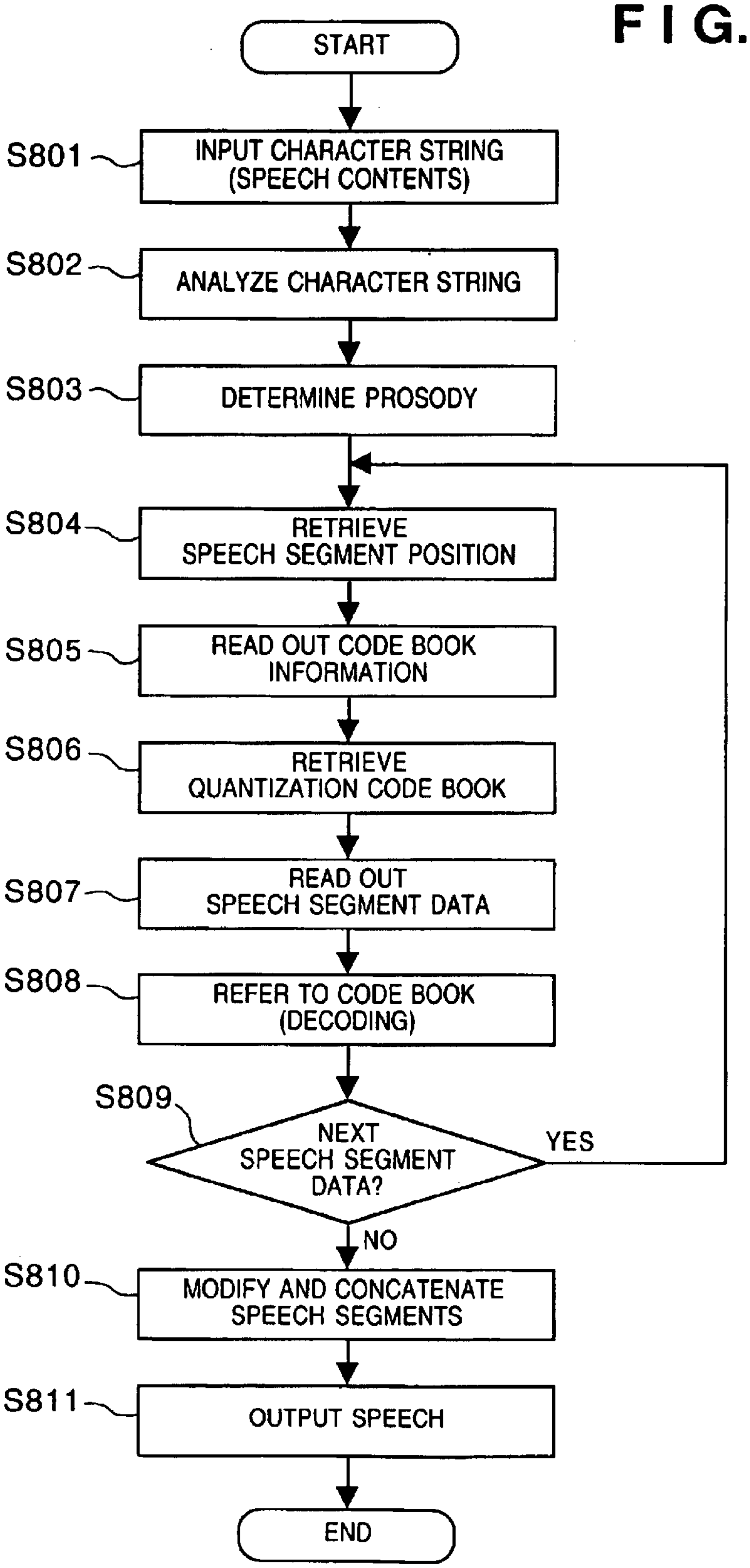
FIG. 8 is a flow chart for explaining a speech synthesis algorithm in the third embodiment of the present invention.

FIG. 8 is a flow chart for explaining the speech synthesis algorithm in the third embodiment of the present invention. A program for achieving this algorithm is stored in the storage device 101. The CPU 100 reads out this program on the basis of an instruction from a user and executes the following procedure. For the sake of simplicity, in this embodiment it is assumed that code books corresponding to all speech segment clusters are previously stored in the storage device 101.

Steps S801 to 803 have the same functions and processes as in steps S501 to S503 of FIG. 5, so a detailed description thereof will be omitted.

In step S804, the CPU 100 obtains an optimum speech segment sequence on the basis of a speech segment sequence obtained in step S802 and prosody determined in step S803. The CPU 100 selects one speech segment contained in this speech segment sequence and retrieves code book information and speech segment data corresponding to the selected speech segment. If the speech segment dictionary 112 is stored in a storage medium such as a hard disk, the CPU 100 sequentially seeks to storage areas of code book information and speech segment data. If the speech segment dictionary 112 is stored in a storage medium such as a RAM, the CPU 100 sequentially moves a pointer (address register) to storage areas of code book information and speech segment data.

In step S805, the CPU 100 reads out the code book information retrieved in step S804 and determines a speech segment cluster of this speech segment data and a scalar quantization code book corresponding to the speech segment cluster. In step S806, the CPU 100 looks up the speech segment dictionary 112 to obtain the scalar quantization code book determined in step S805. In step S807, the CPU 100 reads out the speech segment data retrieved in step S804 from the speech segment dictionary 112. In step S808, the CPU 100 decodes the speech segment data read out in step S807 by using the scalar quantization code book obtained in step S806.

In step S809, the CPU 100 checks whether speech segment data corresponding to all speech segments contained in the speech segment sequence obtained in step S804 are decoded. If all speech segment data are decoded, the flow advances to step S810. If speech segment data not decoded yet is present, the flow returns to step S804 to decode the next speech segment data.

In step S810, on the basis of the prosody determined in step S803, the CPU 100 modifies and connects the decoded speech segments (i.e., edits the waveform). In step S811, the CPU 100 outputs the synthetic speech obtained in step S810 from the loudspeaker of an output device 103.

In the speech synthesis algorithm of the third embodiment as described above, a desired speech segment can be decoded using an optimum quantization code book for a speech segment cluster to which this speech segment belongs. Accordingly, natural, high-quality synthetic speech can be generated.

In the third embodiment, the aforementioned speech synthesis algorithm is realized on the basis of the program stored in the storage device 101. However, a part or the whole of this speech synthesis algorithm can also be constituted by hardware.

First Modification of the Third Embodiment

In the speech segment dictionary formation algorithm of the third embodiment, the procedure of forming a speech segment cluster in accordance with the similarity of the waveform of a speech segment has been explained. However, it is also possible to form a speech segment cluster in accordance with the type (e.g., a voiced fricative sound, plosive, nasal sound, some other voiced sound, or unvoiced sound) of speech segment, and form a quantization code book for each speech segment cluster.

Second Modification of the Third Embodiment

In the speech synthesis algorithm of the third embodiment, in step S805 a scalar quantization code book formed for each speech segment cluster is selected. However, the present invention is not limited to this embodiment. For example, from a plurality of types of scalar quantization code books held by the speech segment dictionary 112, a code book having the highest performance (i.e., by which the quantization distortion is a minimum) can also be chosen.

Third Modification of the Third Embodiment

In the third embodiment, scalar quantization can also be performed by taking the gain (power) into consideration. That is, in step 609 a gain g of speech segment data is obtained prior to selecting a scalar quantization code book. In step S610, the obtained gain g and code book information are written in the speech segment dictionary 112. In step S611, quantization is performed by taking account of the gain g. This means that equation (3) presented earlier is replaced by $$ct=\text{argn min } (xt-g\cdot qn)^2 (0\leqq n<N)$$

Meanwhile, in step S808 (reference to a code book) of the speech synthesis algorithm, the value q obtained by the code book reference is multiplied by the gain g to yield a decoded value.

Fourth Modification of the Third Embodiment

In the third embodiment, an optimum quantization code book is designed for each speech segment cluster, and speech segment data belonging to each speech segment cluster is scalar-quantized by using the designed quantization code book. However, speech segment data found to increase the encoding distortion can also be registered in a speech segment dictionary without being encoded. With this arrangement, degradation of the quality of an unstable speech segment (e.g., a speech segment classified into a voiced fricative sound or a plosive) can be prevented. Also, natural, high-quality synthetic speech can be generated by using a speech segment dictionary thus formed.

Fourth Embodiment

A speech segment dictionary formation algorithm and a speech synthesis algorithm according to the fourth embodiment of the present invention will be described below by using the speech processing apparatus shown in FIG. 1.

In the fourth embodiment, a linear prediction coefficient and a prediction difference are calculated for each speech segment data, and the data is encoded by an optimum quantization code book for the calculated prediction difference. Note that a speech segment to be registered in the speech segment dictionary 112 is composed of a phoneme, semi-phoneme, diphone (e.g., CV or VC), VCV (or CVC), or combinations thereof.

(Formation of Speech Segment Dictionary)

Figure 9:
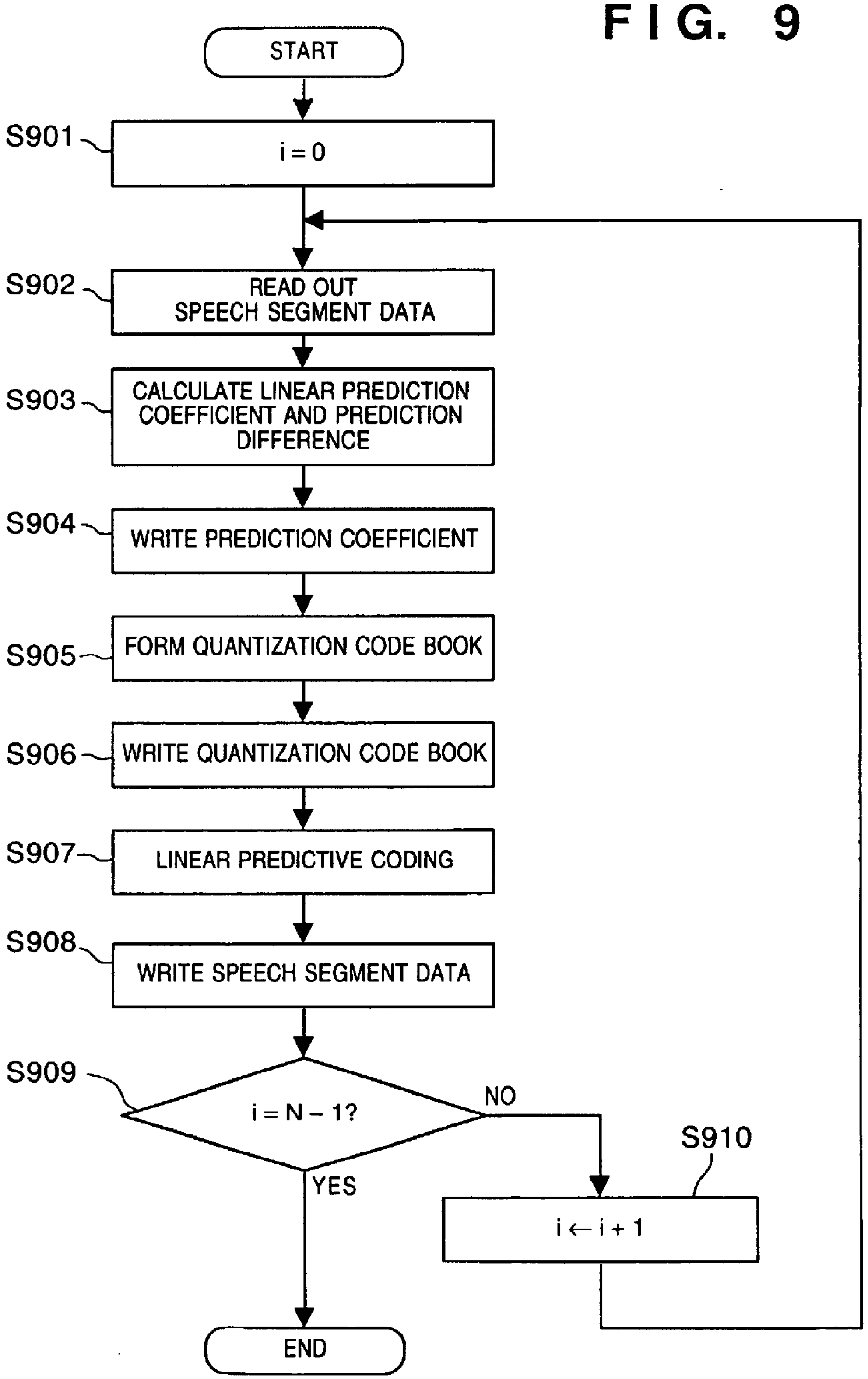
FIG. 9 is a flow chart for explaining a speech segment dictionary formation algorithm in the fourth embodiment of the present invention.

FIG. 9 is a flow chart for explaining the speech segment dictionary formation algorithm in the fourth embodiment of the present invention. A program for achieving this algorithm is stored in a storage device 101. A CPU 100 reads out this program from the storage device 101 on the basis of an instruction from a user and executes the following procedure.

In step S901, the CPU 100 initializes an index i, which indicates each of N speech segment data (each speech segment data is non-compressed) stored in speech segment database 111 of an external storage device 102, to "0". In step S902, the CPU 100 reads out speech segment data (a speech segment before encoding) Wi of the ith speech segment indicated by this index i. Assume that the readout data Wi is $$Wi=\{x0, x1, \ldots, xT-1\}$$

where T is the time length (in units of samples) of Wi.

In step S903, the CPU 100 calculates a linear prediction coefficient and a prediction difference of the speech segment data Wi read out in step S902. Assuming the linear prediction order is order L, this linear prediction model is represented by using a linear prediction coefficient al and a prediction difference dt as $$xt=\Sigma al xt-1+dt \quad (4)$$

where Σ is the summation of 1=1 to L.

Hence, the linear prediction coefficient al which minimizes the square-sum of the prediction difference dt $$\Sigma dt^2 \quad (5)$$

is determined. In this expression, Σ is the summation of t=1 to T−1.

In step S904, the CPU 100 writes the linear prediction coefficient al calculated in step S903 into the speech segment dictionary 112. In step S905, the CPU 100 forms a quantization code book Qi of the prediction difference dt calculated in step S903. More specifically, the CPU 100 decodes the encoded prediction difference dt by using the quantization code book Qi and so designs that a mean square error ρ of decoded data sequence Ei={el, el+1, . . . , eT−1} is a minimum (i.e., the encoding distortion is a minimum). In this case, an algorithm such as an LBG method is usable. With this arrangement, the distortion of the waveform of a speech segment produced by encoding can be minimized. Note that the mean square error ρ can be represented by $$\rho=(1/T)\cdot\Sigma(dt-et)^2 \quad (6)$$

where "Σ" is the summation of t=0 to T−1.

In step S906, the CPU 100 writes the quantization code book Qi formed in step S905 and the like in the speech segment dictionary 112. In addition to the code book Qi, the CPU 100 writes information necessary to decode the speech segment data Wi. Instep S907, the CPU 100 encodes the speech segment data Wi by linear predictive coding by using the linear prediction coefficient al calculated in step S903 and the code book Qi formed in step S905. Assuming the code book Qi is Qi={q0, q1, . . . , qN−1} (N is the quantization step), a code ct corresponding to xt (∈Wi) can be represented by $$ct=\text{argn min } (xt-\Sigma alyt-1-qn)^2 (0<n<N) \quad (7)$$

where yt is the value obtained by encoding and then decoding xt by this method.

In step S908, the CPU 100 writes speech segment data Ci(={c0, c1, . . . , cT−1} encoded in step S907 into the speech segment dictionary 112. In step S909, the CPU 100 checks whether the above processing is performed for all of the N speech segment data. If i=N−1, the CPU 100 completes this algorithm. If not, in step S910 the CPU 100 adds 1 to the index i, the flow returns to step S902, and the CPU 100 reads out speech segment data designated by the updated index i. The CPU 100 repeatedly executes this processing for all of the N speech segment data.

In the speech segment dictionary formation algorithm of the fourth embodiment as described above, it is possible to calculate a linear prediction coefficient and a prediction difference for each speech segment to be registered in the speech segment dictionary 112, and encode the speech segment by an optimum quantization code book for the calculated prediction difference. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the fourth embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 10:
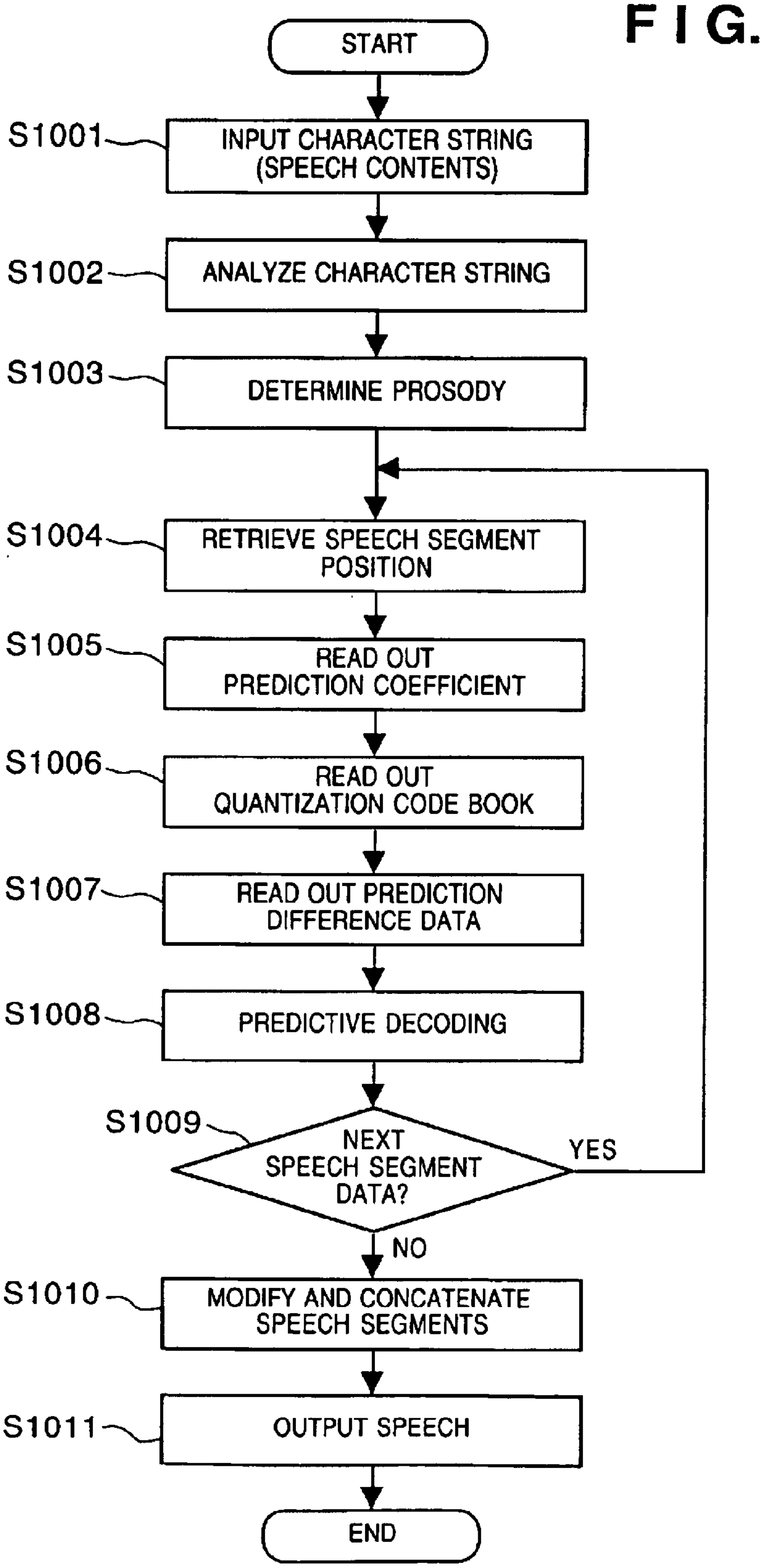
FIG. 10 is a flow chart for explaining a speech synthesis algorithm in the fourth embodiment of the present invention.

FIG. 10 is a flow chart for explaining the speech synthesis algorithm in the fourth embodiment of the present invention. A program for achieving this algorithm is stored in the storage device 101. The CPU 100 reads out this program on the basis of an instruction from a user and executes the following procedure.

In step S1001, the user inputs a character string in Japanese, English, or some other language by using the keyboard and the mouse of an input device 104. In the case of Japanese, the user inputs a character string expressed by kana-kanji mixed text. Instep S1002, the CPU 100 analyzes the input character string and obtains the speech segment sequence of this character string and parameters for determining the prosody of this character string. In step S1003, on the basis of the prosodic parameters obtained in step S1002, the CPU 100 determines prosody such as a duration length (the prosody for controlling the length of a voice), the fundamental frequency (the prosody for controlling the pitch of a voice), and the power (the prosody for controlling the strength of a voice).

In step S1004, the CPU 100 obtains an optimum speech segment sequence on the basis of the speech segment sequence obtained in step S1002 and the prosody determined in step S1003. The CPU 100 selects one speech segment contained in this speech segment sequence and retrieves a linear prediction coefficient, quantization code book, and prediction difference corresponding to the selected speech segment. If the speech segment dictionary 112 is stored in a storage medium such as a hard disk, the CPU 100 sequentially seeks to storage areas of linear prediction coefficients, quantization code books, and prediction differences. If the speech segment dictionary 112 is stored in a storage medium such as a RAM, the CPU 100 sequentially moves a pointer (address register) to storage areas of linear prediction coefficients, quantization code books, and prediction differences.

In step S1005, the CPU 100 reads out the prediction coefficient retrieved in step S1004 from the speech segment dictionary 112. In step S1006, the CPU 100 reads out the quantization code book retrieved in step S1004 from the speech segment dictionary 112. In step S1007, the CPU 100 reads out the prediction difference retrieved in step S1004 from the speech segment dictionary 112. In step S1008, the CPU 100 decodes the prediction difference by using the prediction coefficient, the quantization code book, and the decoded data of the immediately preceding sample, thereby obtaining speech segment data.

In step S1009, the CPU 100 checks whether speech segment data corresponding to all speech segments contained in the speech segment sequence obtained in step S1004 are decoded. If all speech segment data are decoded, the flow advances to step S1010. If speech segment data not decoded yet is present, the flow returns to step S1004 to decode the next speech segment data.

In step S1010, on the basis of the prosody determined in step S1003, the CPU 100 modifies and connects the decoded speech segments (i.e., edits the waveform). In step S1011, the CPU 100 outputs the synthetic speech obtained in step S1010 from the loudspeaker of an output device 103.

In the speech synthesis algorithm of the fourth embodiment as described above, a desired speech segment can be decoded using an optimum quantization code book for the speech segment. Accordingly, natural, high-quality synthetic speech can be generated.

In the fourth embodiment, the aforementioned speech synthesis algorithm is realized on the basis of the program stored in the storage device 101. However, a part or the whole of this speech synthesis algorithm can also be constituted by hardware.

First Modification of the Fourth Embodiment

In the fourth embodiment, as in the first embodiment described earlier, the number of bits (i.e., the number of quantization steps) per sample can be changed for each speech segment data. This can be accomplished by changing the procedures of the fourth embodiment as follows. That is, in the speech segment dictionary formation algorithm, the number of quantization steps is determined prior to the process (the write of the quantization code book) in step S905. The determined number of quantization steps and the code book are recorded in the speech segment dictionary 112. In the speech synthesis algorithm, the number of quantization steps is read out from the speech segment dictionary 112 before the process (the read-out of the quantization code book) in step S1006. As in the first embodiment, the number of quantization steps can be determined on the basis of the encoding distortion.

Second Modification of the Fourth Embodiment

In the fourth embodiment, the linear prediction order L can also be change for each speech segment data. This can be accomplished by changing the procedures of the fourth embodiment as follows. That is, in the speech segment dictionary formation algorithm, the prediction order is set prior to the process (the write of the prediction coefficient) in step S904. The set prediction order and the prediction coefficient are recorded in the speech segment dictionary 112. In the speech synthesis algorithm, the prediction order is read out from the speech segment dictionary 112 before the process (the read-out of the prediction coefficient) in step S1005. As in the first embodiment, this prediction order can be determined on the basis of the encoding distortion.

Third Modification of the Fourth Embodiment

In the fourth embodiment, the encoding performance of the quantization code book formed in step S905 can be further improved. This is so because while in step S905 the code book is optimized for the prediction difference dt, in step S907 the quantization code book is referred to with respect to $$xt-\Sigma alyt-1(\neq dt=xt-\Sigma alxt-1) \qquad (8)$$

An AbS (Analysis by Synthesis) method or the like can be used as an algorithm for updating this code book. In this expression, Σ is the summation of 1=1 to L.

Fourth Modification of the Fourth Embodiment

In the fourth embodiment, one quantization code book is designed for one speech segment data. However, one quantization code book can also be designed for a plurality of speech segment data. For example, as in the third embodiment, it is possible to cluster N speech segment data into M speech segment clusters and design a quantization code book for each speech segment cluster.

Fifth Modification of the Fourth Embodiment

In the fourth embodiment, data of L samples from the beginning of speech segment data can be directly written in the speech segment dictionary 112 without being encoded. This makes it possible to avoid a phenomenon in which linear prediction cannot be well performed for L samples from the beginning of speech segment data.

Sixth Modification of the Fourth Embodiment

In the fourth embodiment, in step S907 the code ct that is optimum for xt is obtained. However, this optimum code ct can also be obtained by taking account of m samples after xt. This can be realized by temporarily determining the code ct and recursively searching for the code ct (searching the tree structure).

Seventh Modification of the Fourth Embodiment

In the fourth embodiment, a quantization code book is so designed that the encoding distortion is a minimum, and speech segment data is linearly encoded by using the designed quantization code book. However, speech segment data whose encoding distortion is larger than a predetermined threshold value can be registered in a speech segment dictionary without being encoded. With this arrangement, degradation of the quality of an unstable speech segment (e.g., a speech segment classified into a voiced fricative sound or a plosive) can be prevented. Also, natural, high-quality synthetic speech can be generated by using a speech segment dictionary thus formed.

Fifth Embodiment

A speech segment dictionary formation algorithm and a speech synthesis algorithm according to the fifth embodiment of the present invention will be described below by using the speech processing apparatus shown in FIG. 1.

In the fifth embodiment, the various encoding schemes used in the previous embodiments are combined, and an optimum encoding method is selected for each speech segment data to be registered in a speech segment dictionary 112. In this fifth embodiment, an unstable speech segment (e.g., a speech segment classified into a voiced fricative sound or a plosive) is processed without being compressed. Note that a speech segment to be registered in the speech segment dictionary 112 is composed of a phoneme, semiphoneme, diphone (e.g., CV or VC), VCV (or CVC), or combinations thereof.

(Formation of Speech Segment Dictionary)

Figure 11:
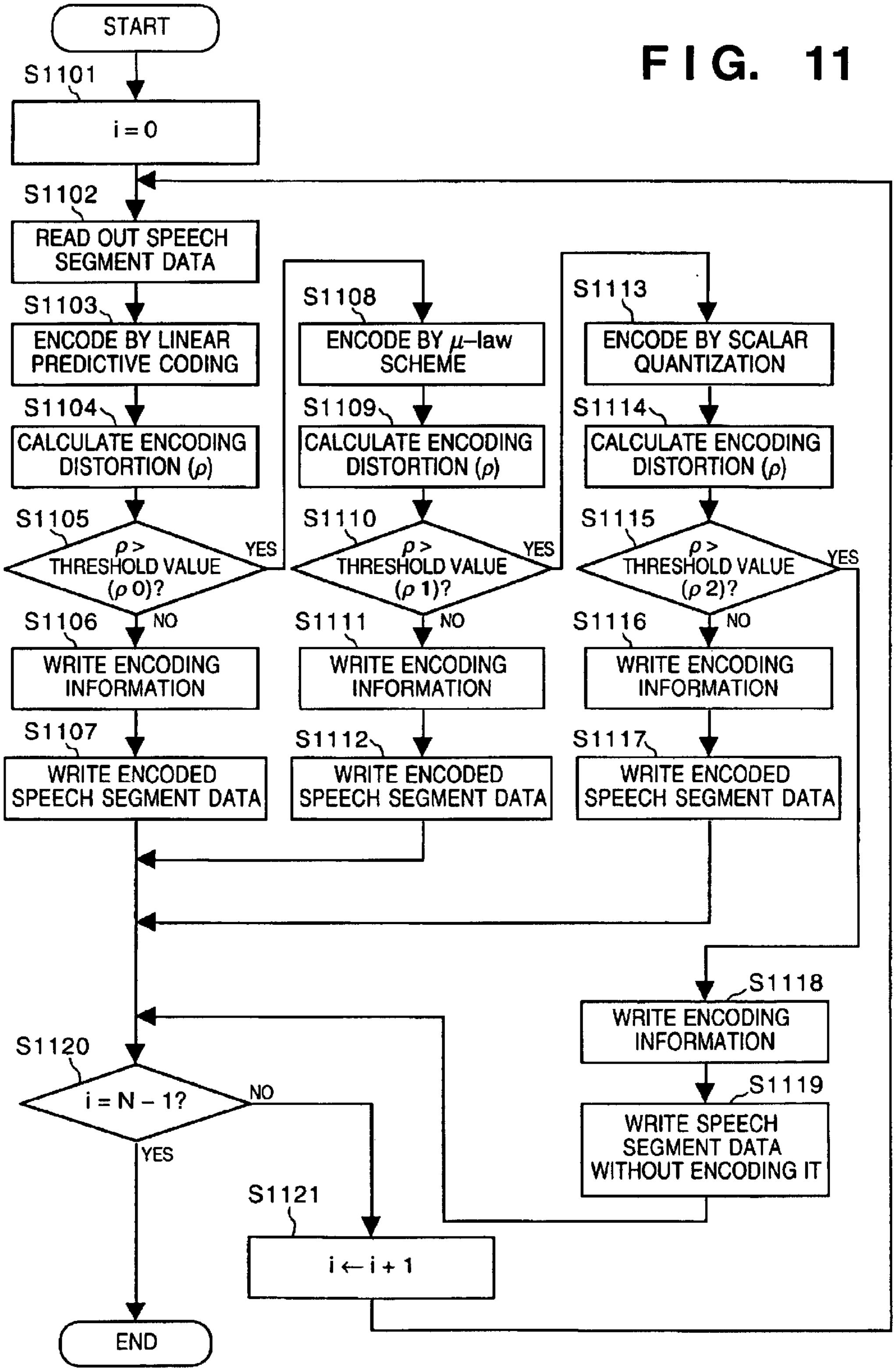
FIG. 11 is a flow chart for explaining a speech segment dictionary formation algorithm in the fifth embodiment of the present invention.

FIG. 11 is a flow chart for explaining the speech segment dictionary formation algorithm in the fifth embodiment of the present invention. A program for achieving this algorithm is stored in a storage device 101. A CPU 100 reads out this program from the storage device 101 on the basis of an instruction from a user and executes the following procedure.

In step S1101, the CPU 100 initializes an index i, which indicates each of N speech segment data (each speech segment data is non-compressed) stored in speech segment database 111 of an external storage device 102, to "0". Note that this index i is stored in the storage device 101.

In step S1102, the CPU 100 reads out ith speech segment data Wi indicated by this index i. Assume that the readout data Wi is $$Wi=\{x0, x1, \ldots, xT-1\}$$

where T is the time length (in units of samples) of Wi.

In step S1103, the CPU 100 encodes the speech segment data Wi read out in step S1102 by using the encoding scheme (i.e., linear predictive coding) explained in the fourth embodiment.

In step S1104, the CPU 100 calculates encoding distortion ρ by this encoding scheme. In step S1105, the CPU 100 checks whether the encoding distortion ρ calculated in step S1104 is larger than a predetermined threshold value ρ0. If ρ>ρ0, the flow advances to step S1108, and the CPU 100 encodes the speech segment data Wi by using another encoding scheme. If ρ>ρ0 does not hold, the flow advances to step S1106.

In step S1106, the CPU 100 writes encoding information of the speech segment data Wi in the speech segment dictionary 112. This encoding information contains information specifying the encoding method by which the speech segment data Wi is encoded and information necessary to decode the speech segment data Wi (e.g., a prediction coefficient and a quantization code book). In step S1107, the CPU 100 writes the speech segment data Wi encoded in step S1103 into the speech segment dictionary 112, and the flow advances to step S1120.

On the other hand, in step S1108 the CPU 100 encodes the speech segment data Wi read out in step S1102 by using the encoding scheme (i.e., the 7-bit μ-law scheme or the 8-bit μ-law scheme) explained in the first embodiment.

In step S1109, the CPU 100 calculates encoding distortion ρ by this encoding scheme. In step S1110, the CPU 100 checks whether the encoding distortion ρ calculated in step S1109 is larger than a predetermined threshold value ρ1. If ρ>ρ1, the flow advances to step S1113, and the CPU 100 encodes the speech segment data Wi by using another encoding scheme. If ρ>ρ1 does not hold, the flow advances to step S1111.

In step S1111, the CPU 100 writes encoding information of the speech segment data Wi in the speech segment dictionary 112. This encoding information contains information specifying the encoding method by which the speech segment data Wi is encoded and information necessary to decode the speech segment data Wi. In step S1112, the CPU 100 writes the speech segment data Wi encoded in step S1108 into the speech segment dictionary 112, and the flow advances to step S1120.

On the other hand, in step S1113 the CPU 100 encodes the speech segment data Wi read out in step S1102 by using the encoding scheme (i.e., scalar quantization) explained in the second or third embodiment.

In step S1114, the CPU 100 calculates encoding distortion ρ by this encoding scheme. In step S1115, the CPU 100 checks whether the encoding distortion ρ calculated in step S1114 is larger than a predetermined threshold value ρ2. For example, the waveform of a strongly unstable speech segment (e.g., a speech segment classified into a voiced fricative sound or a plosive) largely varies, so ρ>ρ2 does not hold. If ρ>ρ2, the flow advances to step S1118. If ρ>ρ2 does not hold, the flow advances to step S1116.

In step S1116, the CPU 100 writes encoding information of the speech segment data Wi in the speech segment dictionary 112. This encoding information contains information specifying the encoding method by which the speech segment data Wi is encoded and information necessary to decode the speech segment data Wi (e.g., a quantization code book). In step S1117, the CPU 100 writes the speech segment data Wi encoded in step S1113 into the speech segment dictionary 112, and the flow advances to step S1120.

On the other hand, in step S1118 the CPU 100 writes encoding information of the speech segment data Wi read out in step S1102 into the speech segment dictionary 112 without compressing the speech segment data Wi. This encoding information contains information indicating that the speech segment data Wi is not encoded. In step S1119, the CPU 100 writes this speech segment data Wi in the speech segment dictionary 112, and the flow advances to step S1120. With this arrangement, deterioration of the quality of an unstable speech segment can be prevented.

In step S1120, the CPU 100 checks whether the above processing is performed for all of the N speech segment data. If i=N−1, the CPU 100 completes this algorithm. If not, in step S1121 the CPU 100 adds 1 to the index i, the flow returns to step S1102, and the CPU 100 reads out speech segment data designated by the updated index i. The CPU 100 repeatedly executes this processing for all of the N speech segment data.

In the speech segment dictionary formation algorithm of the fifth embodiment as described above, an encoding scheme can be selected from the μ-law scheme, scalar quantization, and linear predictive coding for each speech segment to be registered in the speech segment dictionary 112. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the fifth embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 12:
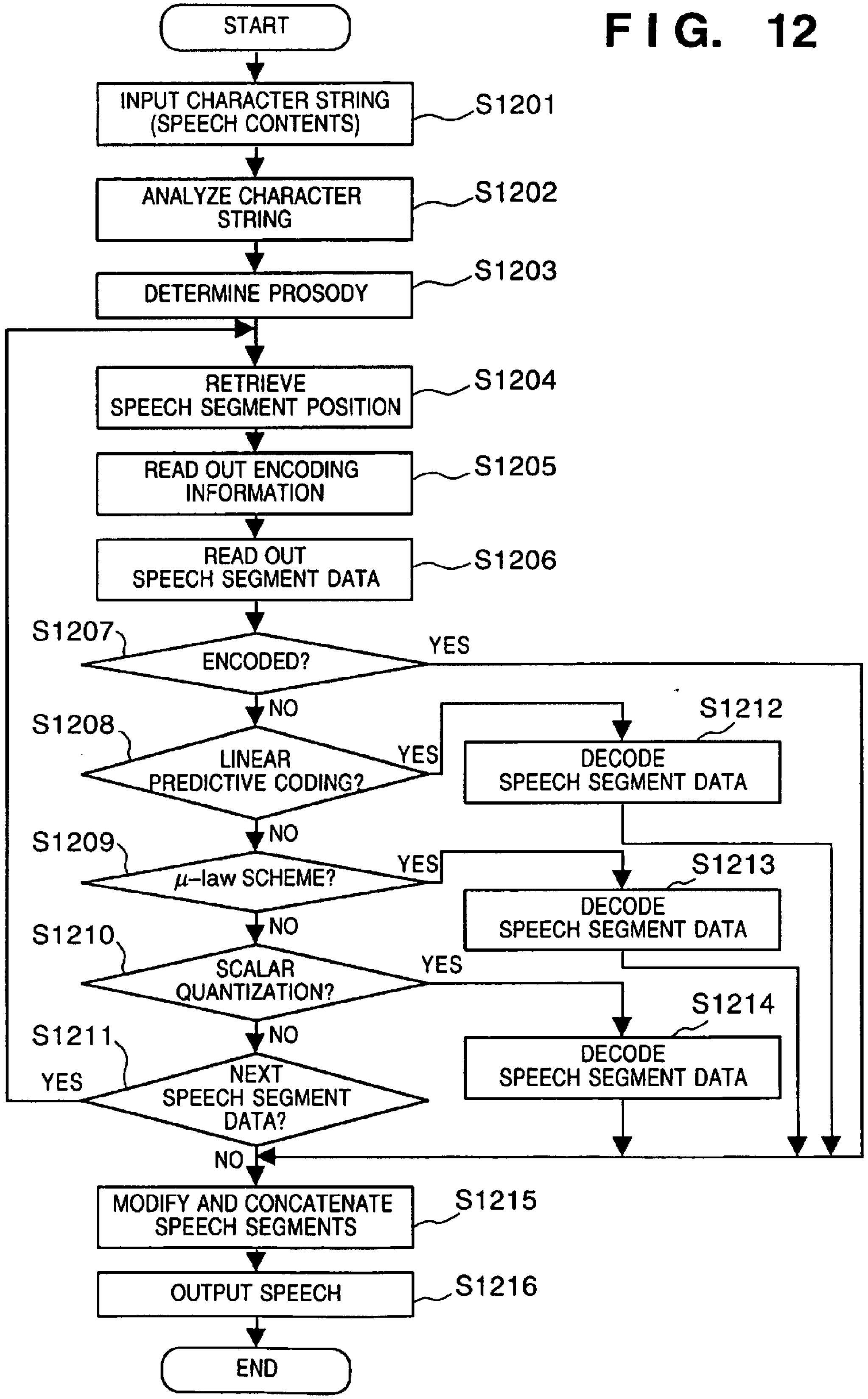
FIG. 12 is a flow chart for explaining a speech synthesis algorithm in the fifth embodiment of the present invention.

FIG. 12 is a flow chart for explaining the speech synthesis algorithm in the fifth embodiment of the present invention. A program for achieving this algorithm is stored in the storage device 101. The CPU 100 reads out this program on the basis of an instruction from a user and executes the following procedure.

In step S1201, the user inputs a character string in Japanese, English, or some other language by using the keyboard and the mouse of an input device 104. In the case of Japanese, the user inputs a character string expressed by kana-kanji mixed text. In step S1202, the CPU 100 analyzes the input character string and obtains the speech segment sequence of this character string and parameters for determining the prosody of this character string. In step S1203, on the basis of the prosodic parameters obtained in step S1202, the CPU 100 determines prosody such as a duration length (the prosody for controlling the length of a voice), fundamental frequency (the prosody for controlling the pitch of a voice), and power (the prosody for controlling the strength of a voice).

In step S1204, the CPU 100 obtains an optimum speech segment sequence on the basis of the speech segment sequence obtained in step S1202 and the prosody determined in step S1203. The CPU 100 selects one speech segment contained in this speech segment sequence and retrieves speech segment data and encoding information corresponding to the selected speech segment. If the speech segment dictionary 112 is stored in a storage medium such as a hard disk, the CPU 100 sequentially seeks to storage areas of speech segment data and encoding information. If the speech segment dictionary 112 is stored in a storage medium such as a RAM, the CPU 100 sequentially moves a pointer (address register) to storage areas of speech segment data and encoding information.

In step S1205, the CPU 100 reads out the encoding information retrieved in step S1204 from the speech segment dictionary 112. In step S1206, the CPU 100 reads out the speech segment data retrieved in step S1204 from the speech segment dictionary 112.

In step S1207, on the basis of the encoding information read out in step S1205, the CPU 100 checks whether the speech segment data read out in step S1206 is encoded. If the data is encoded, the flow advances to step S1208 to specify the encoding method. If the data is not encoded, the flow advances to step S1215.

In step S1208, on the basis of the encoding information read out in step S1205, the CPU 100 examines the encoding method of the speech segment data read out in step S1206. If the encoding method is linear predictive coding, the flow advances to step S1212 to decode the data. In other cases, the flow advances to step S1209.

In step S1209, on the basis of the encoding information read out in step S1205, the CPU 100 examines the encoding method of the speech segment data read out in step S1206. If the encoding method is the μ-law scheme, the flow advances to step S1213 to decode the data. In other cases, the flow advances to step S1210.

In step S1210, on the basis of the encoding information read out in step S1205, the CPU 100 examines the encoding method of the speech segment data read out in step S1206. If the encoding method is scalar quantization, the flow advances to step S1214 to decode the data. In other cases, the flow advances to step S1211.

In step S1211, the CPU 100 checks whether speech segment data corresponding to all speech segments contained in the speech segment sequence obtained in step S1204 are decoded. If all speech segment data are decoded, the flow advances to step S1215. If speech segment data not decoded yet is present, the flow returns to step S1204 to decode the next speech segment data.

In step S1215, on the basis of the prosody determined in step S1203, the CPU 100 modifies and connects the decoded speech segments (i.e., edits the waveform). In step S1216, the CPU 100 outputs the synthetic speech obtained in step S1215 from the loudspeaker of an output device 103.

In the speech synthesis algorithm of the fifth embodiment as described above, a desired speech segment can be decoded by a decoding method corresponding to one of the μ-law scheme, scalar quantization, and linear predictive coding. Therefore, natural, high-quality synthetic speech can be generated.

In the fifth embodiment, the aforementioned speech synthesis algorithm is realized on the basis of the program stored in the storage device 101. However, a part or the whole of this speech synthesis algorithm can also be constituted by hardware.

Sixth Embodiment

A speech segment dictionary formation algorithm and a speech synthesis algorithm according to the sixth embodiment of the present invention will be described below by using the speech processing apparatus shown in FIG. 1.

In the above fifth embodiment, an optimum encoding method is selected from a plurality of encoding methods using different encoding schemes for each speech segment data to be registered in a speech segment dictionary 112. In the sixth embodiment, however, an optimum encoding method is chosen from a plurality of encoding methods using different encoding schemes in accordance with the type of speech segment data. Note that a speech segment to be registered in the speech segment dictionary 112 is constructed of a phoneme, semi-phoneme, diphone (e.g., CV or VC), VCV (or CVC), or combinations thereof.

(Formation of Speech Segment Dictionary)

Figure 13:
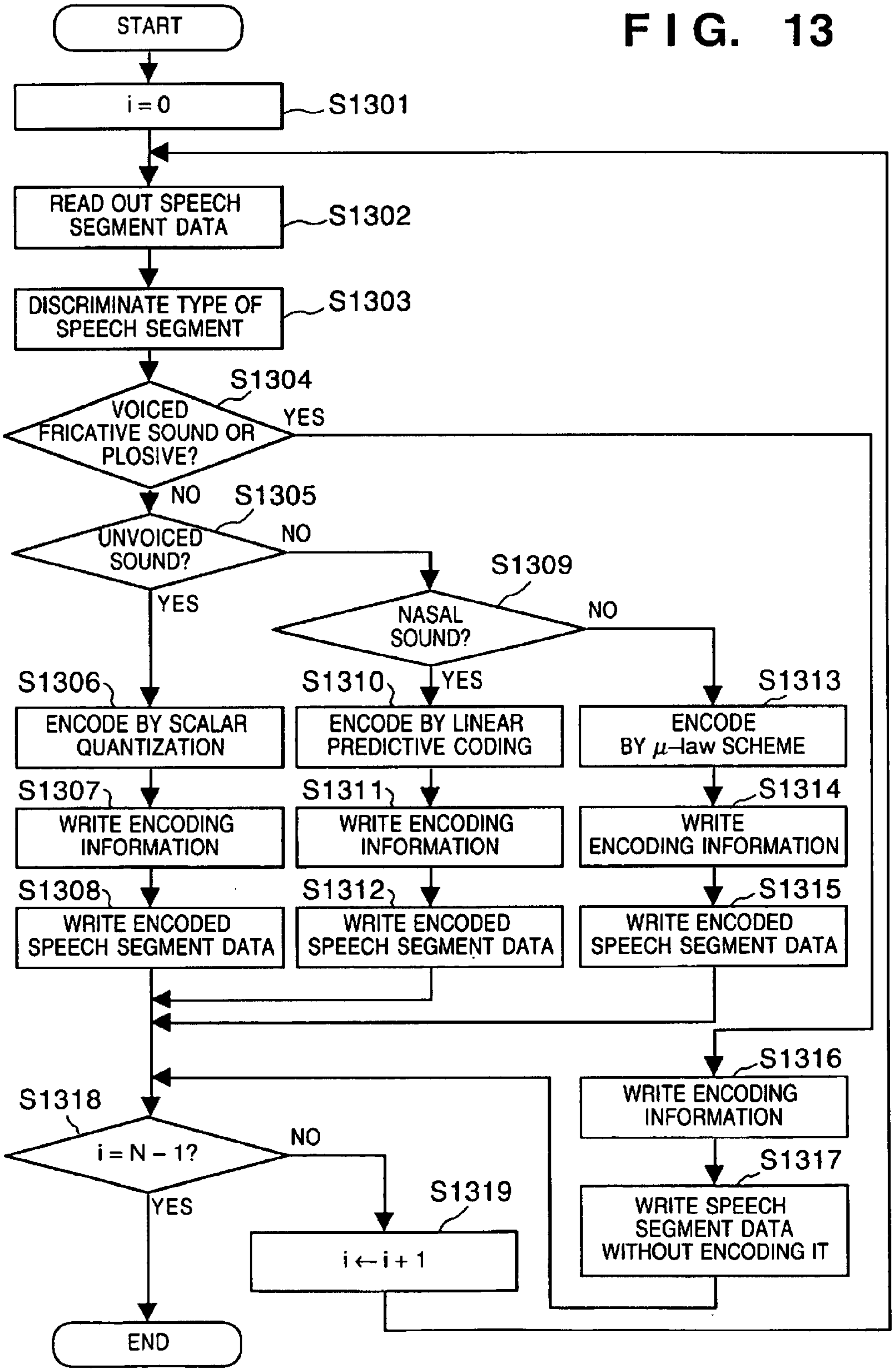
FIG. 13 is a flow chart for explaining a speech segment dictionary formation algorithm in the sixth embodiment of the present invention.

FIG. 13 is a flow chart for explaining the speech segment dictionary formation algorithm in the sixth embodiment of the present invention. A program for achieving this algorithm is stored in a storage device 101. A CPU 100 reads out this program from the storage device 101 on the basis of an instruction from a user and executes the following procedure.

In step S1301, the CPU 100 initializes an index i, which indicates each of N speech segment data (each speech segment data is non-compressed) stored in speech segment database 111 of an external storage device 102, to "0". Note that this index i is stored in the storage device 101.

In step S1302, the CPU 100 reads out ith speech segment data Wi indicated by this index I. Assume that the readout data Wi is $$Wi=\{x0, x1, \ldots, xT-1\}$$

where T is the time length (in units of samples) of Wi.

In step S1303, the CPU 100 discriminates the type of the speech segment data Wi read out in step S1302. More specifically, the CPU 100 checks whether the type of the speech segment data Wi is a voiced fricative sound, plosive, unvoiced sound, nasal sound, or some other voiced sound.

In step S1304, the flow branches on the basis of the result of step SI 303. If the type of the speech segment data Wi is a voiced fricative sound or plosive, the flow advances to step S1316. If not, the flow proceeds to step S1305. In step S1316, the CPU 100 does not compress this speech segment data Wi. With this arrangement, degradation of the quality of the voiced fricative sound or plosive can be prevented. In step S1316, the CPU 100 writes encoding information of the speech segment data Wi in the speech segment dictionary 112. This encoding information contains the type of the speech segment data Wi and information indicating that the speech segment data Wi is not encoded. In step S1317, the CPU 100 writes the speech segment data Wi in the speech segment dictionary 112 without encoding the speech segment data Wi, and the flow advances to step S1318.

In step S1305, the flow branches on the basis of the result of step S1303. If the type of the speech segment data is an unvoiced sound, the flow advances to step S1306. If not, the flow proceeds to step S1309. In step 51306, the CPU 100 encodes the speech segment data Wi by using the encoding scheme (i.e., scalar quantization) explained in the second or third embodiment. In step S1307, the CPU 100 writes encoding information of the speech segment data Wi in the speech segment dictionary 112. This encoding information contains the type of the speech segment data Wi, information specifying the encoding method by which the speech segment data Wi is encoded, and information necessary to decode the speech segment data Wi (e.g. a quantization code book). In step 51308, the CPU 100 writes the speech segment data Wi encoded in step 51306 into the speech segment dictionary 112, and the flow advances to step S1318.

In step S1309, the flow branches on the basis of the result of step S1303. If the type of the speech segment data is a nasal sound, the flow advances to step S1310. In step S1310, the CPU 100 encodes the speech segment data Wi by using the encoding scheme (i.e. linear predictive coding) explained in the fourth embodiment. In step S1311, the CPU 100 writes encoding information of the speech segment data Wi in the speech segment dictionary 112. This encoding information contains the type of the speech segment data Wi, information specifying the encoding method by which the speech segment data Wi is encoded, and information necessary to decode the speech segment data Wi (e.g., a prediction coefficient and a quantization code book). In step 51312, the CPU 100 writes the speech segment data Wi encoded in step S1310 into the speech segment dictionary 112, and the flow advances to step S1318. If not, the flow proceeds to step S1313.

If the type of the speech segment data Wi is some other voiced sound, the flow advances to step S1313. Instep S1313, the CPU 100 encodes the speech segment data Wi by using the encoding scheme (i.e., the 7-bit μ-law scheme or the 8-bit μ-law scheme) explained in the first embodiment. In step S1314, the CPU 100 writes encoding information of the speech segment data Wi in the speech segment dictionary 112. This encoding information contains the type of the speech segment data Wi, information specifying the encoding method by which the speech segment data Wi is encoded, and information necessary to decode the speech segment data Wi. In step S1315, the CPU 100 writes the speech segment data Wi encoded in step S1313 into the speech segment dictionary 112, and the flow advances to step S1318.

In step S1318, the CPU 100 checks whether the above processing is performed for all of the N speech segment data. If i=N−1, the CPU 100 completes this algorithm. If not, in step S1319 the CPU 100 adds 1 to the index i, the flow returns to step S1302, and the CPU 100 reads out speech segment data designated by the updated index i. The CPU 100 repeatedly executes this processing for all of the N speech segment data.

In the speech segment dictionary formation algorithm of the sixth embodiment as described above, an encoding scheme can be selected from the μ-law scheme, scalar quantization, and linear predictive coding in accordance with the type of speech segment to be registered in the speech segment dictionary 112. With this arrangement, a storage capacity necessary for the speech segment dictionary can be very efficiently reduced without deteriorating the quality of speech segments to be registered in the speech segment dictionary. Also, a larger number of types of speech segments than in conventional speech segment dictionaries can be registered in a speech segment dictionary having a storage capacity equivalent to those of the conventional dictionaries.

In the sixth embodiment, the aforementioned speech segment dictionary formation algorithm is realized on the basis of the program stored in the storage device 101. However, a part or the whole of this speech segment dictionary formation algorithm can also be constituted by hardware.

(Speech Synthesis)

Figure 14:
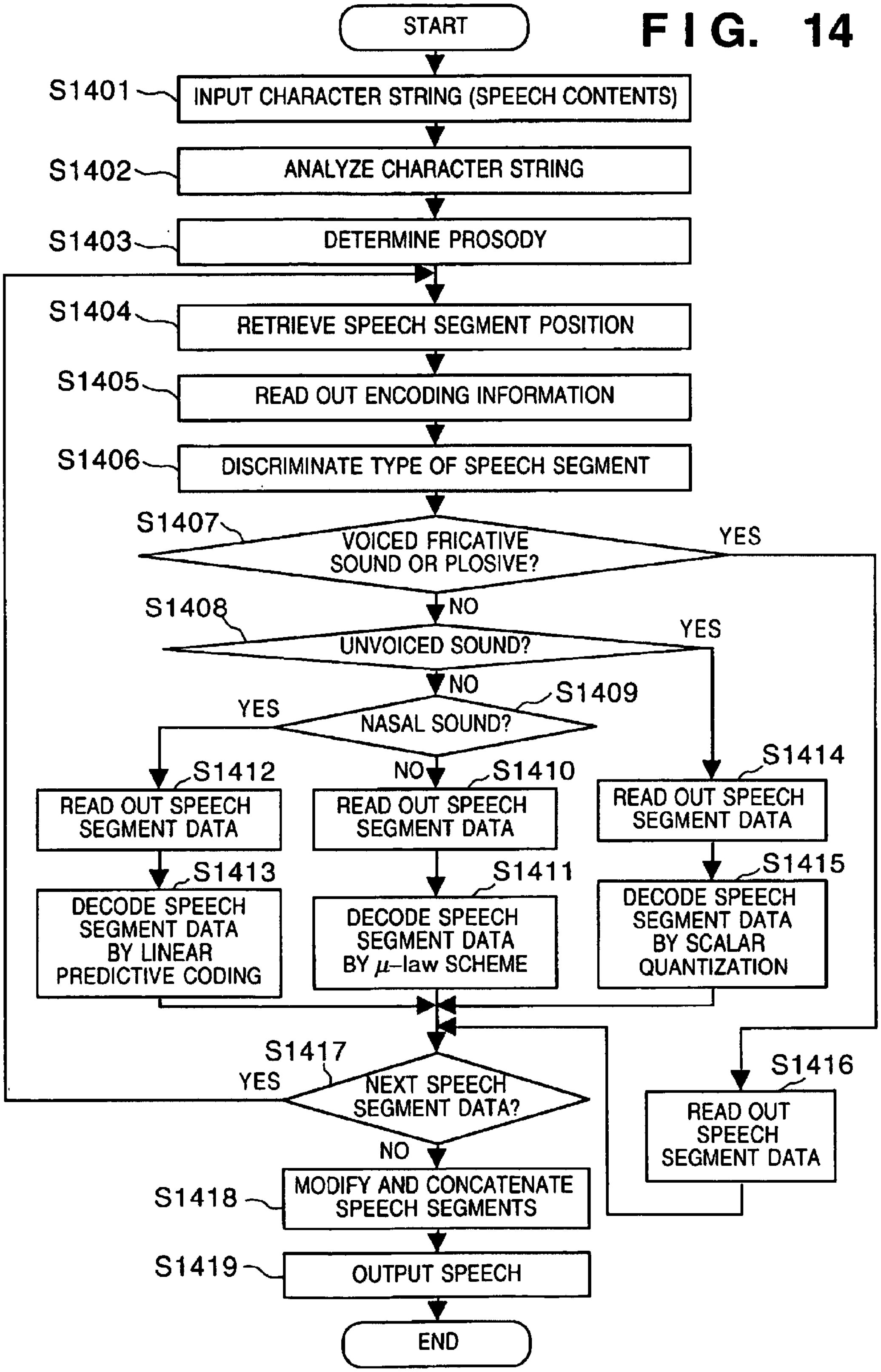
FIG. 14 is a flow chart for explaining a speech synthesis algorithm in the sixth embodiment of the present invention.
Figure 15:
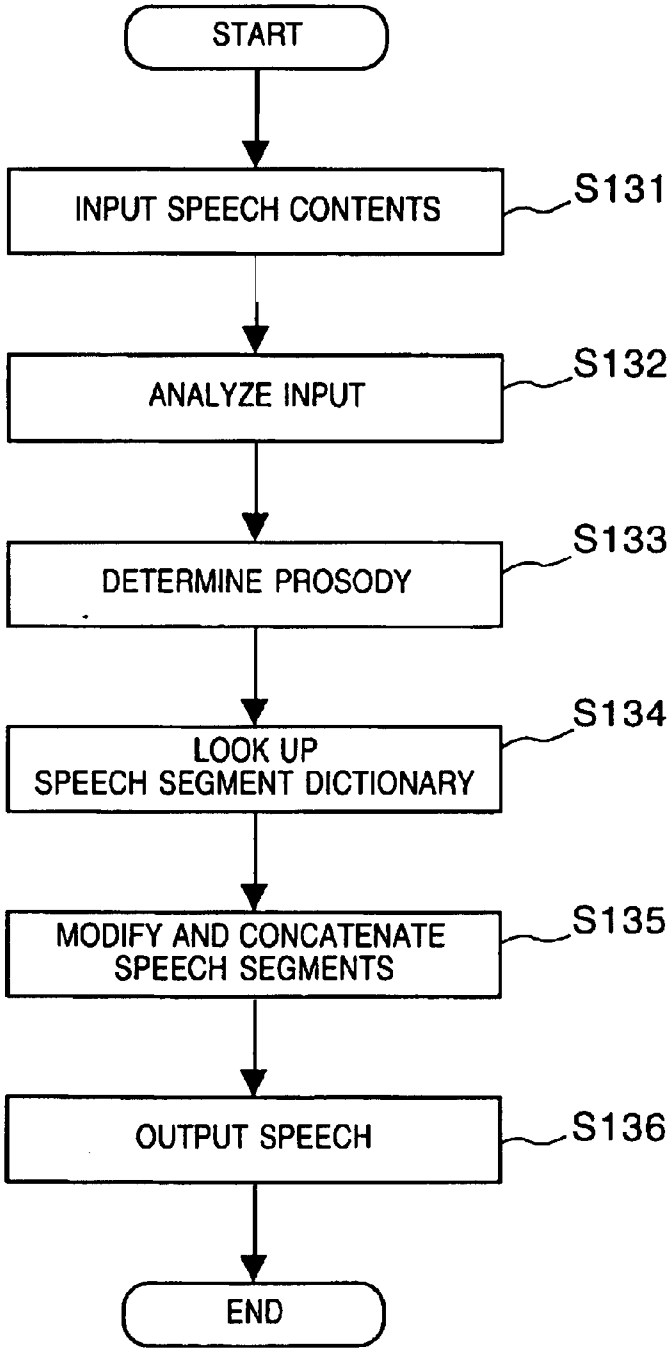
FIG. 15 is a flow chart showing a general speech synthesizing process.

FIG. 14 is a flow chart for explaining the speech synthesis algorithm in the sixth embodiment of the present invention. A program for achieving this algorithm is stored in the storage device 101. The CPU 100 reads out this program on the basis of an instruction from a user and executes the following procedure.

Steps S1401 to S1403 have the same functions and processes as in steps S1201 to S1203 of FIG. 12, so a detailed description thereof will be omitted.

In step S1404, the CPU 100 obtains an optimum speech segment sequence on the basis of a speech segment sequence obtained in step S1402 and prosody determined in step S1403. The CPU 100 selects one speech segment contained in this speech segment sequence and retrieves speech segment data and encoding information corresponding to the selected speech segment. If the speech segment dictionary 112 is stored in a storage medium such as a hard disk, the CPU 100 sequentially seeks to storage areas of speech segment data and encoding information. If the speech segment dictionary 112 is stored in a storage medium such as a RAM, the CPU 100 sequentially moves a pointer (address register) to storage areas of speech segment data and encoding information.

In step S1405, the CPU 100 reads out the encoding information retrieved in step S1404 from the speech segment dictionary 112. In step S1406, the CPU 100 reads out the speech segment data retrieved in step S1404 from the speech segment dictionary 112.

In step S1406, on the basis of the encoding information read out in step S1405, the CPU 100 discriminates the type of the speech segment data retrieved in step S1404. More specifically, the CPU 100 checks whether the type of the speech segment data is a voiced fricative sound, plosive, unvoiced sound, nasal sound, or some other voiced sound.

In step S1407, the flow branches on the basis of the result of step S1406. If the type of the speech segment data is a voiced fricative sound or plosive, the flow advances to step S1416. If not, the flow proceeds to step S1408. In step S1416, the CPU 100 reads out the speech segment data retrieved in step S1404, and the flow advances to step S1417. In this case, this speech segment data is not encoded.

In step S1408, the flow branches on the basis of the result of step S1406. If the type of the speech segment data is an unvoiced sound, the flow advances to step S1414. If not, the flow proceeds to step S1409. In step S1414, the CPU 100 reads out the speech segment data retrieved in step S 1404, and the flow advances to step S 1415. This speech segment data is encoded by scalar quantization. In step S 1415, the CPU 100 decodes this speech segment data on the basis of the encoding information read out in step S1405.

In step S1409, the flow branches on the basis of the result of step S1406. If the type of the speech segment data is a nasal sound, the flow advances to step S 1412. If not, the flow proceeds to step S1410. In step S1412, the CPU 100 reads out the speech segment data retrieved in step S1404, and the flow advances to step S1413. This speech segment data is encoded by linear predictive coding In step S1413, the CPU 100 decodes this speech segment data on the basis of the encoding information read out in step S1405.

If the type of the speech segment data is some other voiced sound, the flow advances to step S1410. In step S1410, the CPU 100 reads out the speech segment data retrieved in step S1404, and the flow advances to step S1411. This speech segment data is encoded by the μ-law scheme. In step S1411, the CPU 100 decodes this speech segment data on the basis of the encoding information read out in step S1405.

In step S1417, the CPU 100 checks whether speech segment data corresponding to all speech segments contained in the speech segment sequence obtained in step S1404 are decoded. If all speech segment data are decoded, the flow advances to step S1418. If speech segment data not decoded yet is present, the flow returns to step S1404 to decode the next speech segment data.

In step S1418, on the basis of the prosody determined in step S1403, the CPU 100 modifies and connects the decoded speech segments (i.e., edits the waveform). In step S1419, the CPU 100 outputs the synthetic speech obtained in step S1418 from the loudspeaker of an output device 103.

In the speech synthesis algorithm of the sixth embodiment as described above, a desired speech segment can be decoded by a decoding method corresponding to one of the μ-law scheme, scalar quantization, and linear predictive coding. With this arrangement, natural, high-quality synthetic speech can be generated.

In the sixth embodiment, the aforementioned speech synthesis algorithm is realized on the basis of the program stored in the storage device 101. However, a part or the whole of this speech synthesis algorithm can also be constituted by hardware.

Other Embodiments

In the second, fourth, and fifth embodiments described above, scalar quantization is used as the method of quantization. However, vector quantization can also be applied by regarding a plurality of consecutive samples as one vector.

Also, it is possible to divide an unstable speech segment such as a plosive into two portions before and after the plosion and encode these two portions by their respective optimum encoding methods. This can further improve the encoding efficiency of an unstable speech segment.

The fourth embodiment has been explained on the basis of a linear prediction model. However, some other vocal cord filter model is also applicable. For example, an LMA (Log Magnitude Approximation) filter coefficient can be used in place of a linear prediction coefficient, and model parameters can be calculated by using the residual error of this LMA filter instead of a prediction difference. With this arrangement, the fourth embodiment can be applied to the cepstrum domain.

Each of the above embodiments is applicable to a system comprising a plurality of devices (e.g., a host computer, interface device, reader, and printer) or to an apparatus (e.g., a copying machine or facsimile apparatus) comprising a single device.

In each of the above embodiments, on the basis of instructions by program codes read out by the CPU 100, an operating system (OS) or the like running on the CPU 100 can execute a part or the whole of actual processing.

Furthermore, in each of the above embodiments, program codes read out from the storage device 101 are written in a memory of a function extension unit connected to the CPU 100, and a CPU or the like of this function extension unit executes a part or the whole of actual processing on the basis of instructions by the program codes.

In each of the embodiments as described above, an encoding method can be selected for each speech segment data. Therefore, a storage capacity necessary for the speech segment dictionary can be very efficiently reduced without deteriorating the quality of speech segments to be registered in the speech segment dictionary. Also, natural, high-quality synthetic speech can be generated by using the speech segment dictionary thus formed.

The present invention is not limited to the above embodiments and various changes and modifications can be made within the spirit and scope of the present invention. Therefore, to apprise the public of the scope of the present invention, the following claims are made.

What is claimed is:

1. A speech information processing method of generating a speech segment dictionary for holding a plurality of speech segments, comprising:

a first encoding step of encoding a speech segment;

a calculation step of calculating an encoding distortion produced at said first encoding step;

a storage step of storing the encoded speech segment encoded in said first encoding step in the speech segment dictionary, in a case where the encoding distortion produced at said first encoding step is less than a predetermined value;

a second encoding step of encoding the speech segment, in a case where the encoding distortion produced at said first encoding step is not less than the predetermined threshold value; and a storing step of storing the encoded speech segment encoded in said second encoding step in the speech segment dictionary.

2. A speech information processing method of generating a speech segment dictionary for holding a plurality of encoded speech segments, comprising:

a construction step of constructing quantization code books using speech segments stored in a speech database;

an encoding step of encoding the speech segments stored in the speech database using the quantization code books that were constructed using the speech segments stored in the speech database; and a storage step of storing in he speech segment dictionary, the encoded speech segments that were encoded in said encoding step.

3. A speech information processing method of generating a speech segment dictionary for holding a plurality of speech segments, comprising:

a selection step of selecting an encoding method of encoding a speech segment from a plurality of encoding methods;

an encoding step of encoding the speech segment by using the selected encoding method; and a storage step of storing the encoded speech segment in a speech segment dictionary, wherein the selected encoding method uses a μ-law scheme, scalar quantization, and linear predictive coding.

4. A speech information processing apparatus for generating a speech segment dictionary for holding a plurality of speech segments, comprising:

selecting means for selecting an encoding method of encoding a speech segment from a plurality of encoding methods;

encoding means for encoding the speech segment by using the selected encoding method;

calculation means for calculating an encoding distortion produced by said encoding means;

selection means for selecting an encoding method of the plurality of encoding methods in which the encoding distortion is smallest; and storage means for storing the encoded speech segment encoded using the encoding method selected by said selection means, in the speech segment dictionary, wherein the selected encoding method uses a iμ-law scheme, scalar quantization, and linear predictive coding.

5. A speech information processing method of synthesizing speech by using a speech segment dictionary for holding a plurality of encoded speech segments, comprising:

a construction step of constructing quantization code books using speech segments stored in a speech database;

an encoding step of encoding the speech segments stored in the speech database using the quantization code books that were constructed using the speech segments stored in the speech database;

a storage step of storing in the speech segment dictionary, the encoded speech segments that were encoded in said encoding step; and a decoding step of decoding the encoded speech segments by using the quantization code books constructed in said construction step.

6. A speech information processing method of synthesizing speech by using a speech segment dictionary for holding a plurality of speech segments, comprising:

a selection step of selecting an encoding method of encoding a speech segment from a plurality of encoding methods;

an encoding step of encoding the speech segment by using the selected encoding method; and a storage step of storing the encoded speech segment in a speech segment dictionary, wherein the selected encoding method uses a μ law scheme, scalar quantization, and linear predictive coding.

7. A speech information processing apparatus for synthesizing speech by using a speech segment dictionary for holding a plurality of speech segments, comprising:

decoding means for decoding the speech segment by using a decoding step of decoding the speech segment by using a plurality of decoding methods for decoding the speech segment;

calculation means for calculating a decoding distortion produced by said decoding means;

selection means for selecting a decoding method of the plurality of decoding methods in which the decoding distortion is smallest; and speech synthesizing means for synthesizing speech on the basis of the decoded speech segment decoded by the decoding method selected by said selection means, wherein the selected decoding method uses a μ-law scheme, scalar quantization, and linear predictive coding.

8. A speech information processing apparatus for generating a speech segment dictionary for holding a plurality of speech segments, comprising:

first encoding means for encoding a speech segment;

calculating means for calculating an encoding distortion produced by said first encoding means;

storage means for storing the encoded speech segment encoded by said first encoding means in the speech segment dictionary, in a case where the encoding distortion produced by said first encoding means is less than a predetermined value;

second encoding means for encoding the speech segment, in a case where the encoding distortion produced by said first encoding means is not less than the predetermined threshold value; and storage means for storing the encoded speech segment encoded by said second encoding means in the speech segment dictionary.

9. A speech information processing apparatus for generating a speech segment dictionary for holding a plurality of encoded speech segments, comprising:

construction means for constructing quantization code books using one or more speech segments stored in a speech database;

encoding means for encoding the speech segments stored in the speech database using the quantization code books that were constructed using the speech segments stored in the speech database; and storage means for storing in the speech segment dictionary, the encoded speech segments that were encoded by said encoding means.

10. A speech information processing apparatus for synthesizing speech by using a speech segment dictionary for holding a plurality of encoded speech segments, comprising:

construction means for constructing quantization code books using speech segments stored in a speech database;

encoding means for encoding the speech segments stored in the speech database using the quantization code books that were constructed using the speech segments stored in the speech database; and storage means for storing in the speech segment dictionary, the encoded speech segments that were encoded by said encoding means; and decoding means for decoding the encoded speech segments by using the quantization code books constructed by said construction means.

* * * * *

UNITED STATES PATENT AND TRADEMARK OFFICE

CERTIFICATE OF CORRECTION

PATENT NO. : 7,092,878 B1 
APPLICATION NO. : 09/630356
DATED : August 15, 2006
INVENTOR(S) : Yamada It is certified that error appears in the above-identified patent and that said Letters Patent is hereby corrected as shown below:

Col. 6, line 15, change "8-bit μ-low" to -- 8-bit μ-law --

Col. 19, line 64, change "If $\rho > p2$" to -- If $\rho > \rho 2$ --

Col. 22, line 37, change "step SI 303" to -- step S1303 --

Col. 22, line 54, change "step 51306" to -- step S1306 --

Col. 22, line 64, change "step 51308" to -- step S1308 --

Col. 22, line 65, change "step 51306" to -- step S1306 --

Col. 23, line 14, change "51312" to -- S1312 --

Col. 24, line 50, insert a "." after "coding" an before "In"

Claim 2, col. 26, line 31 change "in he" to -- in the --

Claim 10, col. 28, line 41 delete "and" following "database;"

Signed and Sealed this

Twenty-ninth Day of May, 2007

JON W. DUDAS
*Director of the United States Patent and Trademark Office*